United States Patent
Ge

(10) Patent No.: US 9,729,677 B2
(45) Date of Patent: Aug. 8, 2017

(54) METHOD OF ADDING CLIENT SERVER AUTOMATION TO COMPUTER LANGUAGES FOR CLOUD COMPUTING

(71) Applicant: David Wei Ge, Kirkland, WA (US)

(72) Inventor: David Wei Ge, Kirkland, WA (US)

(73) Assignee: David Wei Ge, Kirkland, WA (US)

( * ) Notice: Subject to any disclaimer, the term of this patent is extended or adjusted under 35 U.S.C. 154(b) by 0 days.

(21) Appl. No.: 14/697,639

(22) Filed: Apr. 28, 2015

(65) Prior Publication Data

US 2016/0321038 A1    Nov. 3, 2016

(51) Int. Cl.
*H04L 29/06* (2006.01)
*G06F 9/455* (2006.01)
*G06F 9/445* (2006.01)
*G06F 9/44* (2006.01)

(52) U.S. Cl.
CPC .............. *H04L 67/42* (2013.01); *G06F 8/315* (2013.01); *G06F 9/44521* (2013.01); *G06F 9/45529* (2013.01); *H04L 67/40* (2013.01)

(58) Field of Classification Search
CPC ..... H04L 67/42; H04L 67/40; G06F 9/44521; G06F 9/45529; G06F 8/315
See application file for complete search history.

(56) References Cited

U.S. PATENT DOCUMENTS

| | | | | |
|---|---|---|---|---|
| 6,219,711 B1* | 4/2001 | Chari | ................. | G06F 13/4081 709/218 |
| 7,248,603 B1* | 7/2007 | Grunkemeyer | ....... | G06F 9/4425 370/465 |
| 9,336,020 B1* | 5/2016 | Oweis | ................. | G06F 9/44505 |
| 2002/0069399 A1* | 6/2002 | Miloushev | ................. | G06F 8/36 717/108 |
| 2002/0166000 A1* | 11/2002 | Rossi | .................... | G06F 9/4843 719/328 |
| 2008/0016234 A1* | 1/2008 | Horton | ................ | H04L 29/1215 709/230 |
| 2008/0104025 A1* | 5/2008 | Dharamshi | ....... | G06F 17/30896 |
| 2009/0228904 A1* | 9/2009 | Meijer | ..................... | G06F 8/30 719/320 |
| 2010/0037150 A1* | 2/2010 | Sawant | ............ | G06F 17/30896 715/753 |
| 2011/0320521 A1* | 12/2011 | Steiner | ................... | G06F 9/547 709/203 |
| 2012/0079463 A1* | 3/2012 | Freeman | .................. | G06F 8/70 717/137 |

OTHER PUBLICATIONS

Schneider, "Writing effective asynchronous XmlHttpRequests", May 27, 2008.*
Houle, "Converting a Synchronous Program Into an Asynchronous Program" Aug. 13, 2008.*

* cited by examiner

*Primary Examiner* — Viva Miller
(74) *Attorney, Agent, or Firm* — David Wei Ge

(57) ABSTRACT

A method for creating a process of computer programming without mandatorily distinguishing client side programming and server side programming and without mandatorily distinguishing server technologies, a new client server computer programming paradigm is created, in which there is not a distinguish between client side programming and server side programming, client server programming is done in a same way local programming is done.

8 Claims, 14 Drawing Sheets

```
var usedkeys = [];  1204                          1205                    1209
function loop() {                                        function afterloop() {
    var finished = true;                                                                1210
    for(key in obj) {       1206                           ( Operations after loop )
        var hasused = false;
        for(var i=0; i<usedkeys.length; i++) {   }
            if(usedkeys[i] == key) {
                hasused = true;
                break;
            }
        }
        if(hasused) {
            continue;
        }
        else {
            usedkeys.push(key);
            finished = false;
                                           1207
          ( Mixed client server programming 1211
            setTimeout(loop);  1212       )             Fig. 12b break;
        }
    }
    if(finished) {      1208
        afterloop();
    }
});
```

```
                              obj is a server object
        for(key in obj)
1301    {
            if(typeof(obj[key]) != 'function') {

[ Mixed client server programming ]  1302

}
        }
        [ Operations after loop ]  1303
```

Fig. 13a

```
                    1314
for(key in obj) {
    if(typeof(obj[key]) == 'function')   continue;
    var keyused = false;
    for(var i=0; i< clientvalues.usedkeys.length; i++) {
        if(clientvalues.usedkeys[i] == key) {
            keyused = true;         1315
            break;
        }
    }
    if(keyused) {      1316
        continue;
    }
    //                                          1318
```

Server code generated for the first server connection

```
    jsServer.AddDownloadValue('itemkey', key);   1317

//
    break;    1319

}
```

Fig. 13c   Forming of server code for the first server connection
usedkeys must be included in upload value list.

1320

```
function callback() {                    1321
    if(typeof(CSA.values.itemkey) != 'undefined') {
                                          1322
        Client code generated for the first callback }
    else {
        afterloop();   1323
    }
}
```

Fig. 13d    Forming of client code for the first callback func.clientToServer = true;   1401
                                                    1402
```
function func(...) {
        1403
    ... ...                                  1404
    function lastCallback() {
        ... ...    1405                      1406
        func.ret = return value for function func   1407
        if(func.next) {
            func.next();    1408
        }
    }
}
```

Fig. 14a

METHOD OF ADDING CLIENT SERVER AUTOMATION TO COMPUTER LANGUAGES FOR CLOUD COMPUTING

TECHNICAL FIELD

Embodiments of the present invention relate to field of computer software engineering. In particular, embodiments of this invention relate to computer language design and client server programming. In particular, embodiments of this invention relate to extending computer languages to automatically handle client server related programming tasks. Such an extended computer language defines a new programming paradigm for automated client server data passing, execution context switching and code execution, thus the new programming paradigm hides a boundary between client and server from programmers. In particular, processes of the embodiments of the present invention automatically generate client coding and server coding; imitate function scopes between client side coding and server side coding; implement control flows including looping, branching, enumeration and asynchronous function execution in synchronous manner. Examples in JavaScript are provided.

BACKGROUND ART

In client server programming, there is a distinct boundary between client side programming and server side programming. For example, use JavaScript to do client side programming; use PHP to do server side programming; use form submission or AJAX to do interactions between the client side programming and server side programming. Software engineers doing client server programming have to plan and program for client server interactions. Client server programming is a complex task and it is not an easy job to do it right.

There are efforts to make JavaScript to work for both client side programming and server side programming so that a programmer does not need to learn two languages for client side programming and server side programming. For example Node.js (http://nodejs.org/) uses Google® (Google is a trademark of Google Corporation) V8 JavaScript engine to run JavaScript for server side programming. Thus a programmer can use JavaScript for both client side and server side programming.

VBScript (Visual Basic, VB and VBScript are trademarks of Microsoft Corporation) is for web client programming. VB.Net can be used for server side programming. The two Visual Basic languages share lots of syntax similarity.

Script# (http://scriptsharp.com/) converts C# code to JavaScript. Thus C# can be used for both client side programming and server side programming.

Remote procedure calls (Birrell, A. D.; Nelson, B. J., 1984, "Implementing remote procedure calls". ACM Transactions on Computer Systems 2: 39.) and web services (Web Services Architecture, W3C Working Group Note 11 Feb. 2004) use stub-functions to make server function calls appear in client code. Thus, programmers do not need to explicitly code server connections.

Socket.io (http://socket.io/) for Node.js (http://nodejs.org/) enables real-time bidirectional event-based communication; it also uses an approach similar to Remote Procedure Calls (RPC) to achieve network communications. It is a kind of asynchronous RPC mechanism.

Microsoft® ASP.NET automates some aspects of client server programming. Its compiler generates server side code to match client side controls. It uses Auto-post-back so that in handling some events form-submission is automatically done. It uses View State to automatically upload and download control properties. From a programmer's point of view it is as if a same control works at both client side and server side. Client server programming is thus made more intuitive.

The above mentioned technologies make client server programming more intuitive and convenient, but the boundary between client side programming and server side programming still exists.

SUMMARY OF INVENTION

Technical Problem

Comparing to local programming, designing client server interactions is an extra burden to programmers (Davey, B.; RMIT, Melbourne, Vic., Australia; Tatnall, A., Tools for client server computing, Software Engineering: Education and Practice, 1996. Proceedings. International Conference, 24-27 Jan. 1996, Print ISBN: 0-8186-7379-6). It is also a place where programming defects and inefficiency is likely to occur. Ideally a computer language should take over client server related programming tasks so that from a human programmer's point of view there is not a difference in doing programming for a client server execution environment and for a local execution environment.

Merely making a computer language usable in both client side programming and server side programming does not solve the problem. Client side coding and server side coding must be done separately even using the same computer language; a programmer still has to do programming separately for client side coding and server side coding; a programmer still has to design data exchanges between client and server, design correct client server connections and interactions, and design callback functions to fulfill correct client server control flow if asynchronous client server operations are desired.

Remote Procedure Call (RPC) takes over task of network connection. It uses stub-functions to represent server functions. A call of a stub-function in a client code automatically invokes a server connection for executing a corresponding server function. Using stub-function in client code is one step forward to solving the problem; programmers can use sub-functions to execute server code without creating code to do client server connections and uploading function parameters. A synchronous RPC call makes a client program wait for its completion. This behavior is the same as a local function call, thus, client server programming becomes almost as simple as local programming.

But in a web environment, synchronous RPC calls are rarely used because a synchronous RPC call makes a web page unresponsive. In most cases, asynchronous RPC calls are used. In a web environment, mostly AJAX is used to makes asynchronous execution of server operations. Such arrangement is very much different than local programming and much more complex than local programming.

Other than AJAX, combined with technologies of Socket.io (http://socket.io/) and Node.js (http://nodejs.org/), we can create JavaScript code to execute server side code and also make client code to respond to server code events, in an asynchronous manner. But the boundary of client side programming and server side programming still exists. A programmer still has to do client coding and server side coding separately and still has to arrange data exchanges between client coding and server side coding. Some issues related to client server boundary of remote procedure calls are listed below. Such issues make state-of-art client server programming complicated and counter-intuitive.

Complexity of asynchronous programming—callback functions have to be designed to implement sequential operations. Such coding makes it difficult to maintain and show business logic of the coding. "Synchronous programming" is much simpler, intuitive and straighter forward than "asynchronous programming". Ideally, we want to do "asynchronous programming" in the same way as doing "local programming". One of achievements of the embodiments of the present invention is allowing a programmer to do synchronous programming and the synchronous programming is executed asynchronously while maintaining original synchronous programming logic.

Complexity of distinguishing client side coding and server side coding—a server object cannot be placed in a client side code. Client values used in server side operations must be identified and uploading of such values must be properly arranged. Server values used in client side coding must be identified and downloading of such values must be properly arranged. Ideally, we want a programming language to automatically identify upload values and download values required by a programming.

Microsoft ASP.NET automates some aspects of client server programming. Its compiler generates server side code to match client side controls. It uses Auto-post-back so that in handling some events form-submission is automatically done. It uses View State to automatically upload and download control properties. From a programmer's point of view it is as if a same control works at both client side and server side. Client server programming is thus made more intuitive. Although the boundary between client and server still exists, programming becomes more intuitive and convenient. Such convenience is not cheap, though. Suppose what a programmer wants to do is only to execute some server code at an event of a button click, then treating a client click event to be a server event is really convenient. But usually a programmer not only wants to execute server code but also wants to execute some client side code and some server side code in a desired control flow and conditions, according to various business requirements. ASP.NET provides remedies for such situations. For example programmers may use functions RegisterClientScriptBlock and RegisterStartupScript to insert client side coding when handling server events. Using such techniques correctly is not an easy task, though. Automatic control properties uploading and downloading is also not cheap, web page could slow down noticeably. Programmers may write code to fine tune ASP.NET View State storage, but it is a complex issue, and cannot be done right easily. The View State might slow down a web page for seconds and even minutes if it is not used properly (Understanding ASP.NET View State, Scott Mitchell, May 2004, http://msdn.microsoft.com/en-us/library/ms972976.aspx). All such burdens are on the programmers.

U.S. patent application Ser. No. 14/221,180 provides a process for creating a computer compiler to create a new programming paradigm to hide complexity of client server programming from programmers. The process analyses human programming and identifies client operations, server operations, upload and download values required, client to server connections needed, and generates client side coding, server side coding, and client to server interactions. Thus client server programming can be done in a way local programming is done. The process is called "client server automation".

If the client server automation is added to an existing computer language then the programmers may use a familiar computer language to do client server programming in a way local programming is done.

When extending an existing computer language to add client server automation for web programming, there is a fundamental problem that web programming requires asynchronous operations while a computer language dictates synchronous operations. In a computer language, one statement executes after another; when an AJAX call is used to execute some server operations, the client operations following an AJAX call are executed immediately in parallel with the server operations. It is as if an AJAX call spawns a new thread for the server operations. Callback functions have to be used to arrange desired operation sequence. It is counter intuitive to have to design callback functions to fulfill program control flow, instead of expecting client operations following an AJAX call should wait for server operations to finish. If more than one AJAX call is needed then more than one callback function is needed, programming design and maintenance become much more complicated.

Suppose there are two lines of code in a computer language:
Line 1: code 1
Line 2: code 2
code 2 starts to execute only after code 1 finishes. This is a typical case of synchronous operation.

For a computer language supporting threading, parallel executions can be achieved by spawning threads as following pseudo coding shows.
Line 1: spawn code 1
Line 2: code 2
By synchronous nature of a computer language, Line 2 will wait for Line 1 to finish. Line 1 starts a new thread to execute code 1; once the new thread starts, Line 1 finishes and Line 2 is executed. Thus code 2 starts to be running while code 1 may still be running and thus code 1 and code 2 are running in parallel. This is a typical case of asynchronous operations. Let's call it "intended asynchronous".

In a case of web programming with HTTP and AJAX, or with Node.js, a case of "unintended asynchronous" arises. Suppose code 1 represents server operations to be fulfilled by an AJAX call:
Line 1: code 1 (server operations)
Line 2: code 2
By nature of a computer language, code 2 should wait for code 1 to finish. A programmer making the above coding is expecting such synchronous executions to fulfill desired business logic.

But if the server operations are to be executed by an AJAX call then code 1 will be executed in parallel with execution of code 2. That is not what the programmer wants. It is a case of "unintended asynchronous".

The desired execution is that even code 1 executes in a separate thread, code 2 still waits, but not blocks a thread, for code 1 to finish. There is not a computer language providing such support without programming efforts from programmers. Programmers have to use supported techniques, such as Join, Wait, Callbacks, etc., to arrange desired program control flow.

C# provides "yield return" and "yield break" statements, they look like asynchronous operations but actually they are not. With help of these keywords, loop logic code and item processing code are separated. The operations are still synchronous.

Solution to Problem

The embodiments of the present invention provide processes for extending an existing computer language to add client server automation for client server programming by making a language support implicit asynchronous operations. That is, while an asynchronous operation is executed for running server operations, client operations following it are automatically arranged into a callback function and thus are waiting for the server operations to finish but not blocking the web page thread at the same time. Thus, intuitive nature of synchronous execution is simulated and asynchronous execution is actually used as required by a web environment. The embodiments of the present invention provide processes for generating callback functions to arrange program control flow to keep the synchronous nature of a computer language, while using asynchronous server connections for executing server functions. Therefore, programmers get benefits from both synchronous and asynchronous programming, transparently.

The embodiments of the present invention provide processes for removing boundary between client side programming and server side programming by generating server coding and client coding, imitating execution scopes by identifying server operations and client operations, upload values, download values and state values for stateless server connections, generating server connections for executing server coding, generating callback functions for server connections.

Advantageous Effects of Invention

By implementing present invention, a computer language handles client server operations implicitly and makes client server programming transparent to programmers. Human programmers use a familiar computer language to do client server programming in a way local programming is done. It brings following advantages effects.

Client server programming using present invention is more intuitive. Disappearing of client server boundary allows programmers to focus on implementing business logic instead of worrying about implementing client server interactions and callbacks. Suppose one part of business logic can be implemented by 3 operations. It is intuitive to code 3 operations sequentially: op1; op2; op3. Suppose op2 is actually executed on a server. A programmer does not need to worry about treating op2 differently. Behind the scene op2 is executed by an asynchronous server call and op3 is arranged into a callback function; the execution context and variables in scope for op2 to work are also imitated on the server.

Comparing to web programming by form submission, the web programming using present invention is more efficient because necessary upload, download and state values are identified and used automatically, instead of blindly upload and download all form values.

The client server programming using present invention is less bug-prone because coding for client server interactions and arranging callback functions for required business logic, which is a complex task, is generated by machine not by human programmers.

BRIEF DESCRIPTION OF DRAWINGS

In FIG. 10b, that server to client execution context switching point is replaced by a callback function. The branching condition is duplicated at server code and in the callback function.

FIG. 11b shows a code structure to be generated by a client-server-automation preprocessor in processing of code looping shown in FIG. 11a.

FIG. 12a shows a programming situation to be processed by a client-server-automation preprocessor. The programming is formed by an enumeration of client values.

FIG. 12b shows a code structure to be generated by a client-server-automation preprocessor in processing of client value enumeration shown in FIG. 12a.

FIG. 13a shows a programming situation to be processed by a client-server-automation preprocessor. The programming is formed by an enumeration of server values.

FIG. 13b shows a code structure to be generated by a client-server-automation preprocessor in processing of server value enumeration shown in FIG. 13a.

FIG. 13c shows a code structure to be generated by a client-server-automation preprocessor in processing of server value enumeration shown in FIG. 13a; the code structure is for generating server code of the first server connection for implementing a programming shown in FIG. 13a.

FIG. 13d shows a code structure to be generated by a client-server-automation preprocessor in processing of server value enumeration shown in FIG. 13a; the code structure is for generating callback function of the first server connection for implementing a programming shown in FIG. 13a.

FIG. 14a shows a code structure to be generated by a client-server-automation preprocessor in processing of a client function which involves server operations.

FIG. 14b shows a programming which involves calling of a client function; the client function involves server operations; the client function is processed as shown in FIG. 14a.

FIG. 14c shows a code structure to be generated by a client-server-automation preprocessor in processing of a calling of a client function as shown in FIG. 14b; the client function is processed as shown in FIG. 14a.

DESCRIPTION OF EMBODIMENTS

Function names used in Figures are used for illustration purpose only. A client-server-automation preprocessor generates unique function names to avoid name conflictions.

One embodiment of this invention is by implementing client-server-automation in a one-way direction of client to server requests and responses, that, requests are always initiated from client. These implementations can be symmetrically applied to an opposite direction of server to client requests and responses for bi-directional network protocols. For example, in an environment of Node.js, socket.io can be used to send messages from server to client.

Figure 1:
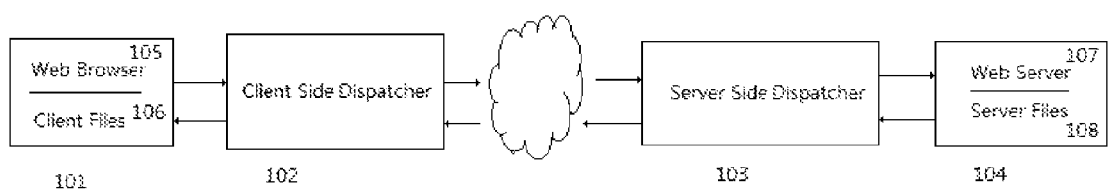
FIG. 1 shows a general structure of a client-server-automation enabled web environment.
Figure 5:
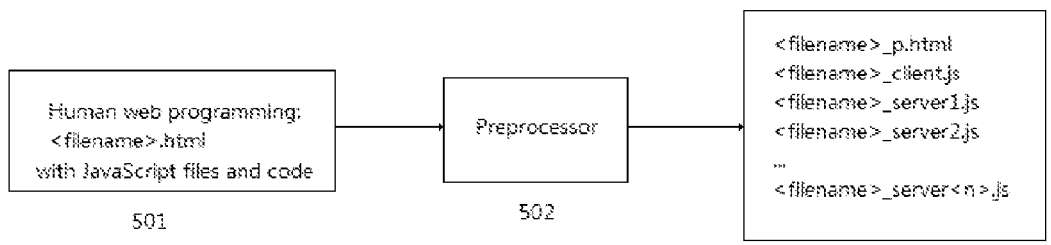
FIG. 5 shows inputs and outputs of a client-server-automation preprocessor. The outputs are written to files to be executed by a state-of-art web browser and a state-of-art web server.

One embodiment of this invention is by adding client-server-automation capability to JavaScript language. This embodiment basically includes two major parts. One part is a client-server-automation enabled web environment, as shown in FIG. 1. The other part is a client-server-automation preprocessing utility which processes human web programming and generates web files to be executed in the client-server-automation enabled web environment, as shown in FIG. 5.

Referring to FIG. 1, it represents a client-server-automation enabled web environment. A web environment consists of a web browser 105 and a web server 107. To make a web environment client server automation enabled, a client side dispatcher 102 and a server side dispatcher 103 are inserted into the environment, as stated in claim 1. As stated in claim 1, the client side dispatcher 102 is responsible for making server connections to the server side dispatcher 103, uploading client values and server code to be executed on a specific server connection, processing downloaded values and making downloaded values accessible to callback functions, and executing callback functions. The server side dispatcher 103 accepts connections from the client side dispatcher 102. The server side dispatcher 103 is responsible for processing uploaded values, executing server side code and download server values to the client side dispatcher 102. The client side dispatcher 102 is implemented in a JavaScript file csa.js. The implementation of the server side dispatcher 103 depends on server technology used by web server. Embodiments of this invention include implementations for PHP, ASPX and Node.js.

Figure 2:
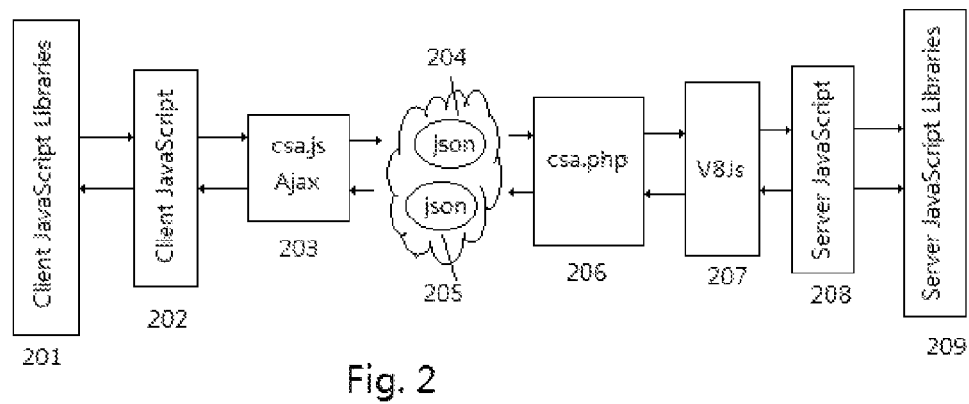
FIG. 2 shows a client-server-automation enabled web environment; the server side dispatcher is implemented by a PHP file csa.php, which uses V8Js (http://php.net/manual/en/book.v8js.php) to execute server side JavaScript code.

Referring to FIG. 2, for a case of using PHP as the server technology, a client server automation enabled web environment uses a PHP file csa.php 206 as the server side dispatcher (103 in FIG. 1). In this environment, client side JavaScript code 202 accesses client side libraries 201 for client side functionalities and accesses a client side dispatcher csa.js 203 for server connections. The client side dispatcher csa.js 203 uses Ajax to connect to the server side dispatcher csa.php 206 and uploads values through a JSON object 204. The server side dispatcher csa.php 206 parses the JSON object 204 to get client values and server code to be executed. The server side dispatcher csa.php 206 uses V8Js 207 (http://php.net/manual/en/class.v8js.php) to execute the server code 208. The server code 208 uses server side libraries 209. The server side dispatcher csa.php 206 prepares download values in a JSON object 205 to be processed by the client side dispatcher csa.js 203.

Figure 3:
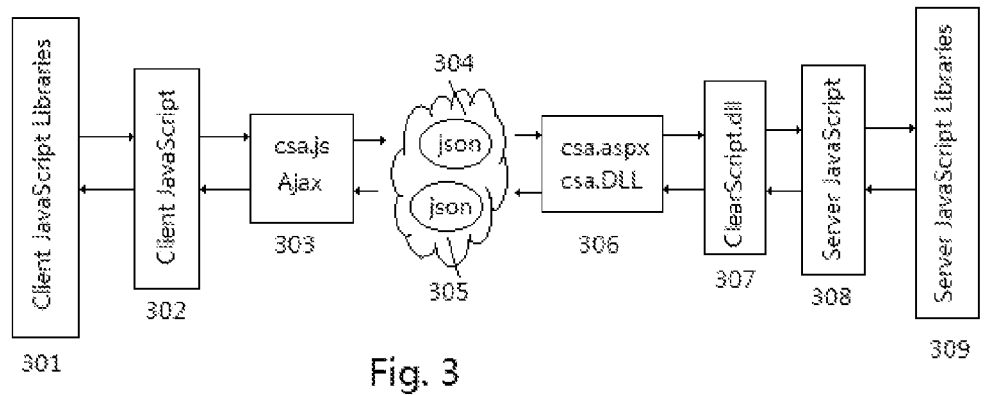
FIG. 3 shows a client-server-automation enabled web environment; the server side dispatcher is implemented by an ASPX file csa.aspx and its corresponding code behind DLL file csa.DLL, which uses ClearScript.DLL to execute server side JavaScript code. ClearScript can be downloaded from https://clearscript.codeplex.com/.

Referring to FIG. 3, for a case of using ASPX as the server technology, a client server automation enabled web environment uses an ASPX file csa.aspx and a DLL file csa.dll 306 as the server side dispatcher (103 in FIG. 1). In this environment, client side JavaScript code 302 accesses client side libraries 301 for client side functionalities and accesses a client side dispatcher csa.js 303 for server connections. The client side dispatcher csa.js 303 uses Ajax to connect to the server side dispatcher csa.aspx/csa.dll 306 and uploads values through a JSON object 304. The server side dispatcher csa.aspx/csa.dll 306 parses the JSON object 304 to get client values and server code to be executed. The server side dispatcher csa.aspx/csa.dll 306 uses ClearScript.Dll 307 (https://clearscript.codeplex.com/) to execute the server code 308. The server code 308 uses server side libraries 309. The server side dispatcher csa.aspx/csa.dll 306 prepares download values in a JSON object 305 to be processed by the client side dispatcher csa.js 303.

Figure 4:
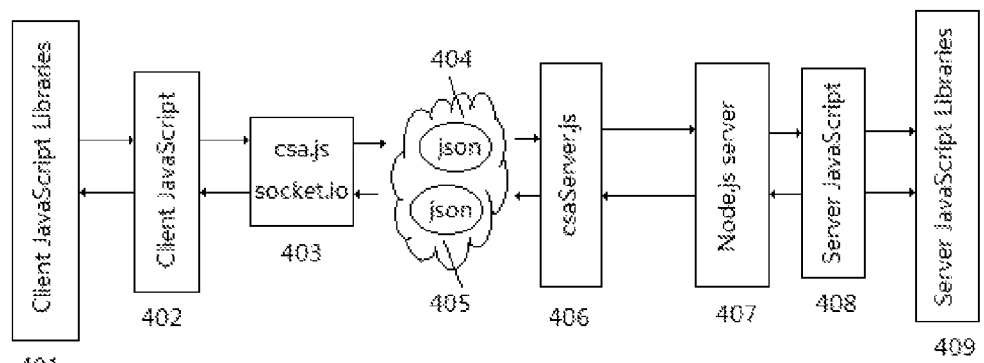
FIG. 4 shows a client-server-automation enabled web environment; the server side dispatcher is implemented by a JavaScript file csaServer.js which is to be started by Node.js as a web server; csaServer.js uses Node.js to execute server side JavaScript code and uses socket.io for network connections. Node.js can be downloaded from http://nodejs.org/ .socket.io can be downloaded from http://socket.io/.

Referring to FIG. 4, for a case of using Node.js as the server technology, a client server automation enabled web environment uses a JavaScript file csaServer.js 406 as the server side dispatcher (103 in FIG. 1). JavaScript file csaServer.js is a web server executed by Node.js. In this environment, client side JavaScript code 402 accesses client side libraries 401 for client side functionalities and accesses a client side dispatcher csa.js 403 for server connections. The client side dispatcher csa.js 403 uses soclet.io (http://socket.io/) to connect to the server side dispatcher csaServer.js 406 and upload values through a JSON object 404. The server side dispatcher csaServer.js 406 parses the JSON object 404 to get client values and server code to be executed. The server side dispatcher csaServer.js 406 uses Node.js 407 (http://nodejs.org/) to execute the server code 408. The server code 408 uses server side libraries 409. The server side dispatcher csaServer.js 406 prepares download values in a JSON object 405 to be processed by the client side dispatcher csa.js 403.

Referring to FIG. 5, a client server automation preprocessor 502 is responsible for processing human programming 501 in a HTML file, which may include JavaScript code and files, to produce a set of files 503 to be distributed to a client server automation enabled web environment. As stated in claim 1, the preprocessor processes programming 501 and generates client side code represented by JavaScript file <filename>_client.js in 503, the client side code includes code for making server connection; the preprocessor generates server side code for each server connection, the server side code is represented by JavaScript file <filename>_server<i>.js for i-th server connection, i=1, 2, . . . , n, shown in 503. The client server automation preprocessor 502 can be a standalone utility to be executed before a testing or a production distribution. The client server automation preprocessor 502 can also be included in a JavaScript engine or a web server to be executed automatically when a web page is served.

Figure 6:
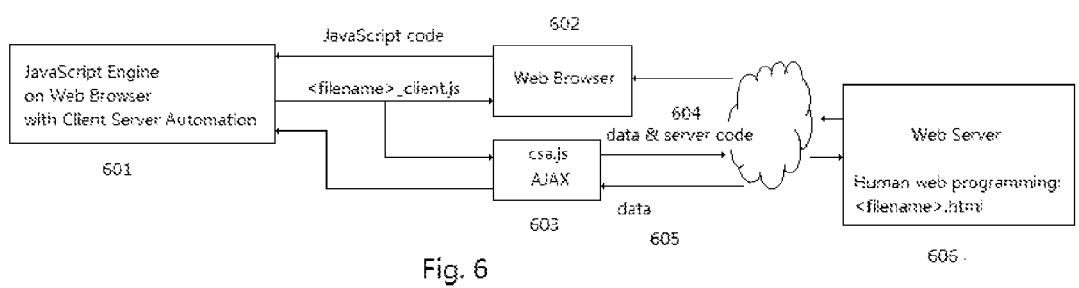
FIG. 6 shows a client-server-automation enabled web environment; a client-server-automation preprocessor runs by a web browser.

Referring to FIG. 6, the client server automation preprocessor (502 in FIG. 5) can be merged into a JavaScript engine 601 to be executed on the fly. In this arrangement, developers do not need to execute a standalone utility for testing and deployment. Human web programming is distributed directly to a web server 606. A web browser 602 gets a web page from the web server 606; JavaScript code on the web page is sent to the JavaScript Engine 601 for processing; the JavaScript Engine 601 runs the client server automation preprocessor to generate a set of code which includes client side JavaScript code and server side JavaScript code. The client side dispatcher 603 makes server calls to upload values and also send server side JavaScript code 604 to the web server. The client side dispatcher 603 processes download values 605 and invokes callback functions.

Figure 7:
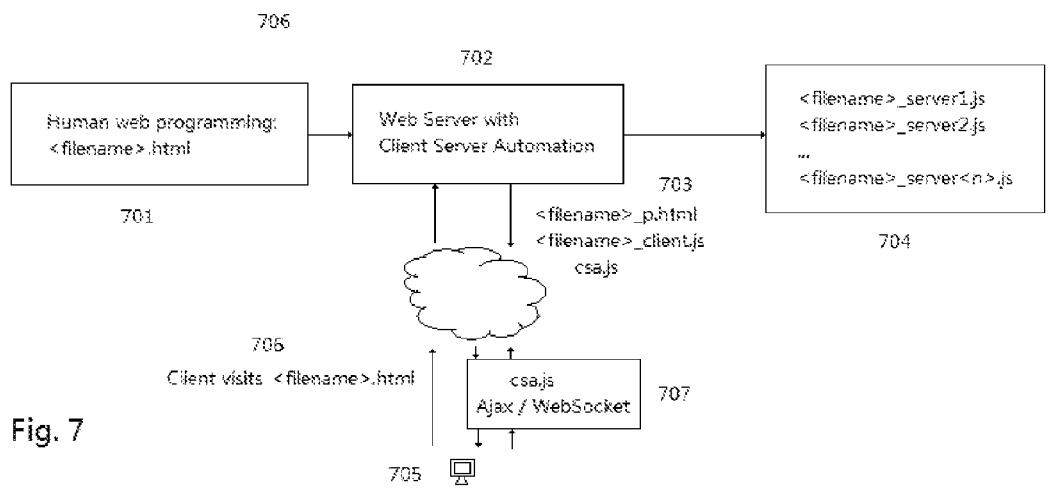
FIG. 7 shows a client-server-automation enabled web environment; a client-server-automation preprocessor runs by a web server.

Referring to FIG. 7, the client server automation preprocessor (502 in FIG. 5) can be merged into a web server 702 to be executed on the fly. In this arrangement, developers do not need to execute a standalone utility for testing and deployment. Human web programming 701 is distributed directly to a web server. At the time a client 705 visits a web page 706, the web server 702 runs the client server automation preprocessor to generate a set of files and sends client side files 703 to the client. The csa.js in 703 is not generated on the fly, it is the client side dispatcher; files <filename>_p.html and <filename>_client.js in 703 are generated on the fly. Files for server side code, <filename>_server1.js, <filename>_server2, . . . , <filename>_server<n> in 704 are generated on the fly. There can be optimizations applying to this arrangement, for example, use HTML header and file time to determine if an HTML file is modified after the last time it is processed by the preprocessor so that the HTML file does not have to be processed every time it is visited. The client side dispatcher 707 makes server calls to notify the server to execute one of server side JavaScript files in 704 for each server call.

One embodiment of this invention is by creating a preprocessor to process web application programming in JavaScript in a HTML file and identifies client operations, server operations, client server execution context switching points, client values and server values needed for imitating execution scopes assumed in the human programming, as stated in claim 1; the preprocessor collects client side operations into one JavaScript file, which is referred to as client JavaScript file; the preprocessor collects server side operations into several JavaScript files, which are referred to as server JavaScript files; the preprocessor modifies the HTML file by removing those JavaScript files and code which are converted into code in the client JavaScript file and the server JavaScript files, and by including the client JavaScript file in the HTML file; the preprocessor inserts a server connection at each client to server execution context switching point. The preprocessor checks a "RunAt" attribute of a property, method, or event to determine if the property, method or event is at server or at client; if the "RunAt" attribute does not exist then the preprocessor checks the "RunAt" attribute of the owner object of the property, method or event and uses the owner object's "RunAt" attribute to make the determination; if the owner object does not have a "RunAt" attribute then the preprocessor assumes that the owner object is a client object and all its properties, methods and events are at client.

Figure 8:
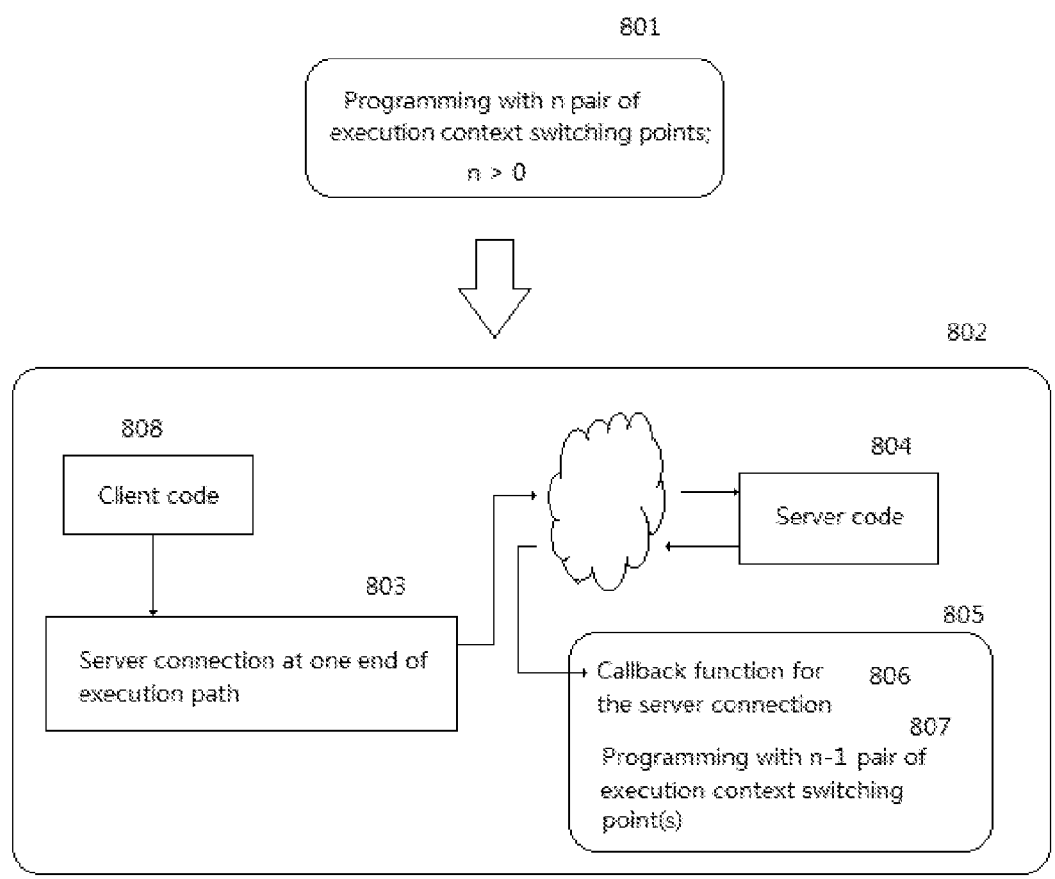
FIG. 8 shows one step of a basic work process of a client-server-automation preprocessor. It removes one pair of client to server and server to client execution context switching points. The step is to be repeated by the preprocessor until all execution context switching points are removed.

Referring to FIG. 8, a client server automation preprocessor processes a programming 801 of n pairs of client to server and server to client execution context switching points, n>0, by repeatedly removing execution context switching points, one pair at a time, as stated in claim 2. The preprocessor generates a server connection 803 for one client to server execution context switching point. Server code 804 is generated for the server connection using server code after the client to server execution context switching point. A callback function 805 is generated for the server connection; it includes rest of un-processed programming 807 which involves n−1 pairs of client to server and server to client execution context switching points. Thus the server connection 803 is at one end of execution path, as stated in claim 2. 801 is thus converted to 802; 802 has reduced the number of pairs of execution context switching points by one. This process keeps going on until all client server execution context switching points are removed.

One embodiment of this invention is by creating a preprocessor to process sequential operations in JavaScript by grouping client operation groups and server operation groups, and thus identifying client to server execution context switching points where a server operation group follows a client operation group, and server to client execution context switching points where a client operation group follows a server operation group. The preprocessor inserts a server connection at each client to server execution context switching point and arranges the client operation group following the server code for the server connection into a callback function for the server connection; the preprocessor arranges client values needed for executing the server code into upload values for the server connection; the preprocessor arranges server values needed for executing the callback function into download values for the server connection.

One part of one embodiment of this invention includes a process used by said preprocessor to process sequential operations in a human programming, known as a process of processing sequential operations; said process handles a situation where client operations group 1 is followed by a server operations group, the server operations group is followed by client operations group 2 and rest of programming, the server operations group is not empty, if client operations group 2 is empty then the rest of programming is also empty; said process generates a server connection at the end of client operations group 1 to execute the server operations group; said process generates a callback function to execute client operations group 2 and the rest of programming if client operations group 2 is not empty.

Figure 9A:
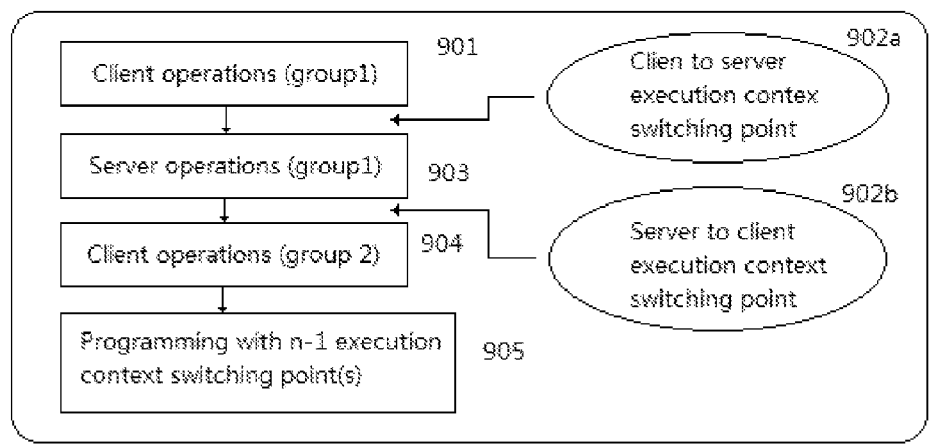
FIG. 9a shows a programming situation to be processed by a client-server-automation preprocessor. The programming is formed by sequential operations of mixed client operations and server operations. The client-server-automation preprocessor identifies a pair of client to server and server to client execution context switching points.
Figure 9B:
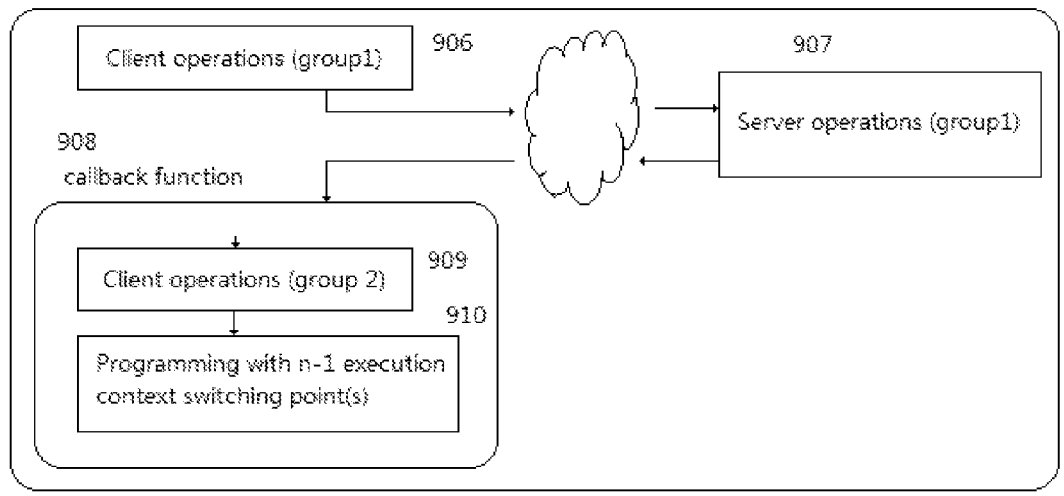
FIG. 9b shows one step of processing a programming shown in FIG. 9a made by a client-server-automation preprocessor. A pair of execution context switching points shown in FIG. 9a is replaced by a client to server connection and a callback function in FIG. 9b.

Referring to FIG. 9*a*, a client server automation preprocessor processes sequential operations 901, 903, 904 and 905, as stated in the process of processing sequential operations. There are n pairs of client to server and server to client execution context switching points. One pair of client to server and server to client execution context switching points includes 902a and 902b. There is one client to server execution point 902a before 903. There is one server to client execution context switching point 902b after 903. The other n−1 pairs of client to server and server to client execution context switching points are in Programming 905. Referring to FIG. 9b, the preprocessor removes the pair of execution context switching points 902a and 902b in FIG. 9a by generating a server connection after client operation group 906 and generating server code 907 from server operations 903 in FIG. 9a for the server connection. The preprocessor generates a callback function 908 to include client operations 909 and rest of programming 910 which is 905 in FIG. 9a. There are n pairs of execution context switching points in FIG. 9a. There are n−1 pairs of execution context switching points in FIG. 9b.

One embodiment of this invention is by creating a preprocessor to process human programming in JavaScript with code branching, where a code branching is classified into 6 situations.

Criteria for Situation 1 are as following, the current execution context is server and the first programming statement in each branch is a client operation. A preprocessor handles this situation in the following way: the code branching is treated as a client operation and a server to client execution context switching point is identified to be before the code branching, the code branching is placed in a client callback function; each code branch is further processed by said preprocessor separately.

Criteria for Situation 2 are as following, the current execution context is server, at least there is one branch having its first programming statement being a server operation and at least there is one client operation in one of code branches. A preprocessor handles this situation in the following way: a server to client execution context switching point is identified, the code branching is duplicated at both server side and a client side callback function, server operations at beginning of each branch are included in server side code branching to be generated, client side code branching is formed by client operations at beginning of each branch and client operations following server operations at beginning of each branch.

Criteria for Situation 3 are as following, the current execution context is client, and branching condition involves client values only. A preprocessor handles this situation in the following way: the code branching is treated as a client operation and thus there is not an execution context change, each branch is further processed by said preprocessor separately.

Criteria for Situation 4 are as following, the current execution context is client and branching condition involves server values.

Situation 4 is further classified into two sub-situations Situation 4a and Situation 4b.

Situation 4a is identified if the current execution context is within a callback function generated for a server connection by a client-server-automation preprocessor. A preprocessor handles this situation in the following way: it is treated as situation 3 and the server values involved in the branching condition are download values treated as client values.

Situation 4b is identified if the current execution context is not within a callback function generated for a server connection by a client-server-automation preprocessor. A preprocessor handles this situation in the following way: a client to server execution context switching point is identified, client values used in the branching condition are upload values, server code is generated to get server values used in the branching condition, the current execution context switches to be server execution context, processing of the code branching is switched to situations of "current execution context is server" which includes situation 1 and situation 2.

Criteria for Situation 5 are that all code branches are empty. A preprocessor does not treat Situation 5 as a code branching, it treats it as an expression statement; the branching condition is the expression.

Criteria for Situation 6 are that all code branches involve only server operations. A preprocessor treats Situation 6 as one single server operation.

Figure 10A:
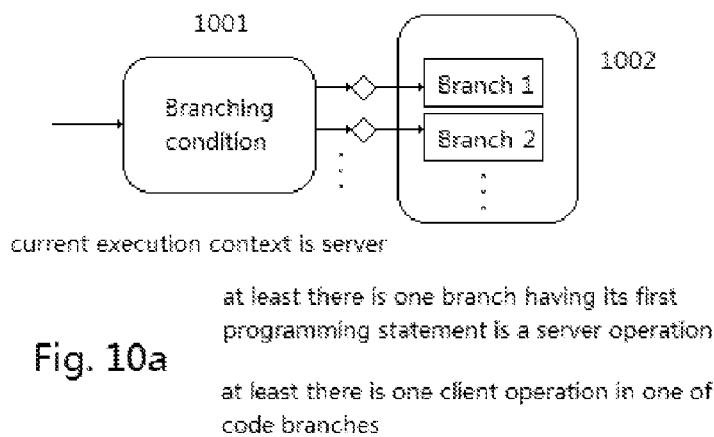
FIG. 10a shows a programming situation to be processed by a client-server-automation preprocessor. The programming is formed by a code branching; the current execution context is server; at least there is one branch having a server operation as its first programming statement; at least there is one client operation in one of code branches.
Figure 10B:
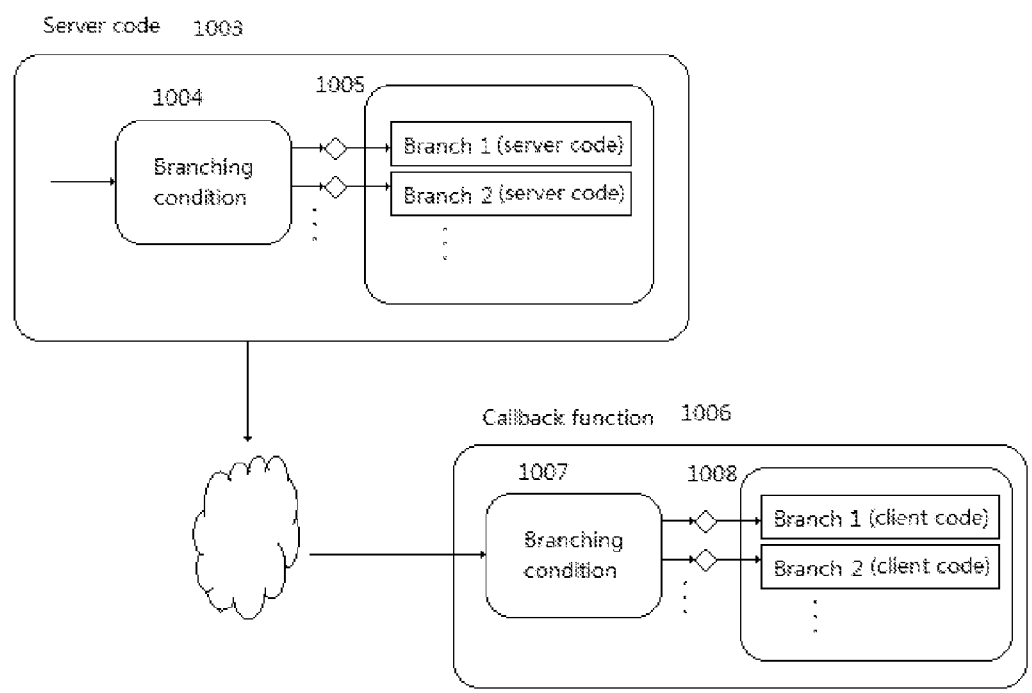
FIG. 10b shows one step of processing a programming shown in FIG. 10a made by a client-server-automation preprocessor. The code branching shown in FIG. 10a is identified as a server to client execution context switching point.

Referring to FIG. 10a, a human programming uses a code branching condition 1001 to branch code path to branches 1002. FIG. 10b shows how a preprocessor handles Situation 2, that is, the current execution context is server, among 1002 at least there is one branch having its first programming statement being a server operation and at least there is one client operation in one of code branches. Referring to FIG. 10b, as stated in claim 3, branching condition is duplicated at server side 1004 and client side 1007 in a callback function 1006; server side code branches 1005 include server operations at beginning of each code branch; client side code branches 1008 include client operations in each branch.

Figure 11A:
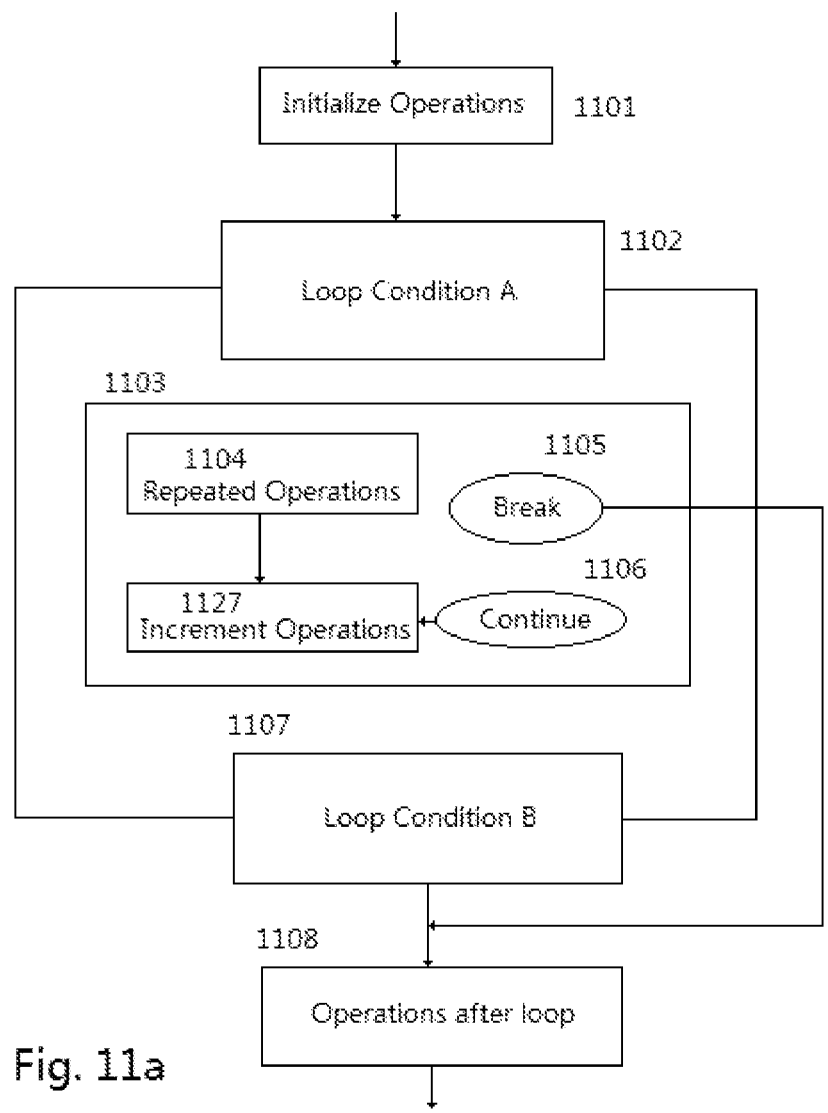
FIG. 11a shows a programming situation to be processed by a client-server-automation preprocessor. The programming is formed by a code looping.
Figures 11B, 12A:
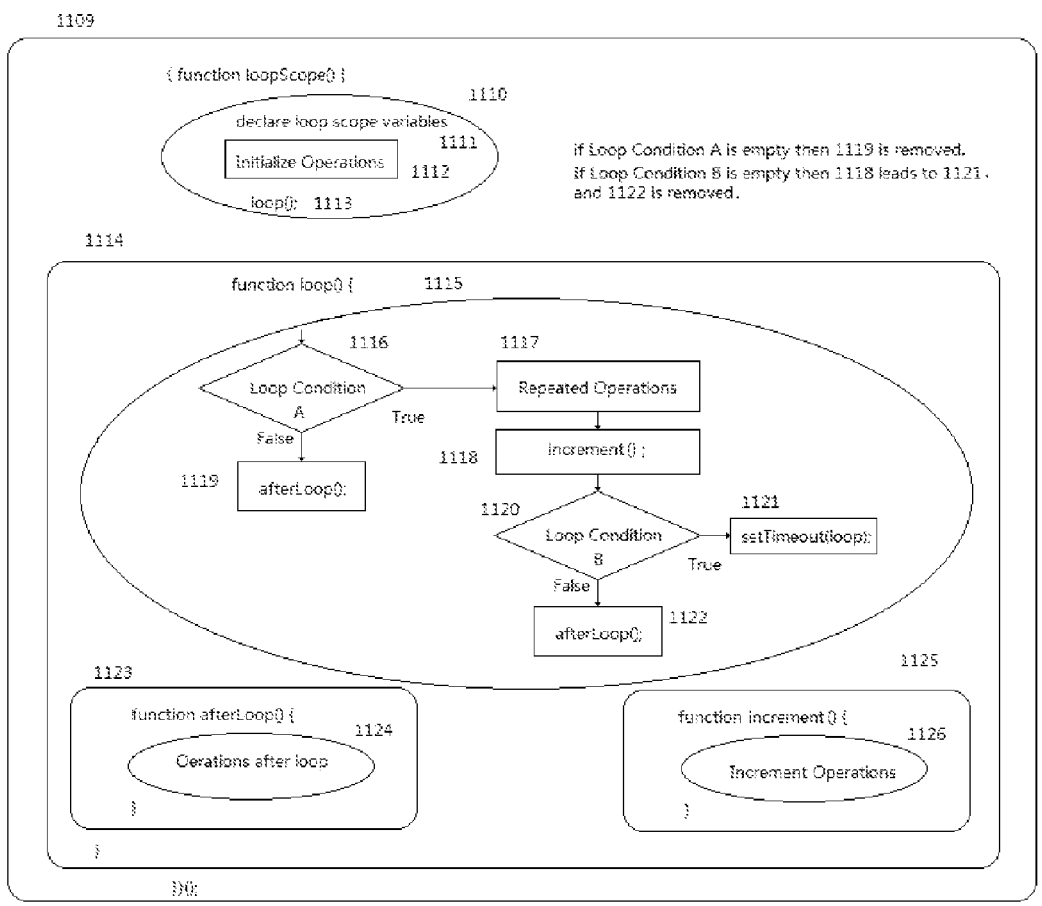

One embodiment of this invention is by creating a preprocessor to process human programming in JavaScript involving a mixed code looping, where a mixed code looping is a code looping which involves server values or server operations inside repeated operations. Referring to FIG. 11a, a code looping consists of Initialize Operations 1101, Loop Condition A 1102, Loop Condition B 1107, Operations after loop 1108 and loop contents 1103 which includes Repeated Operations 1104 and Increment Operations 1127, Break 1105 and Continue 1106. 1102, 1103 and 1107 execute repeatedly. If Loop Condition A 1102 or Loop Condition B 1107 present and evaluate to False then the execution jump to 1108 and the code looping breaks. A Break 1105 makes the execution jump to 1108 and the code looping breaks. A Continue 1106 makes the execution jump to 1127. There is at least one server operation among 1102, 1107, 1104 and 1127. As stated in claim 4, the preprocessor processes such a code looping by generating a recursive function to simulate a code looping. Referring to FIG. 11b, the preprocessor generates a function loopScope 1109 and code executing the function. The preprocessor processes programming 1110 and places generated code inside function loopScope 1109. Programming 1110 includes variable declarations 1111 which declares loop scope variables declared within the programming of code looping, Initialize Operations 1112 which is 1101 in FIG. 11a, and a call 1113 of a loop function 1114. The preprocessor generates a loop function 1114 inside loopScope function 1109. The preprocessor processes programming 1115 and places generated code inside loop function 1114. Programming 1115 includes Loop Condition A 1116 which is 1102 in FIG. 11a, if 1116 evaluates False then it makes a function call 1119 to an afterLoop function 1123, if 1116 evaluates True then Repeated Operations 1117 is executed followed by a function call 1118 to increment function 1125, following function call 1118 is an evaluation of Loop Condition B 1120 which is 1107 in FIG. 11a. If 1120 evaluates to False then it makes a function call 1122 to function afterLoop 1123, if 1120 evaluates to True then it makes a recursive call 1121 to loop function 1114. The preprocessor generates an afterLoop function 1123, the preprocessor processes Operations after loop 1124, which is 1108 in FIG. 11*a*, and places generated code inside afterLoop function 1123. The preprocessor generates an increment function 1125, the preprocessor processes Increment Operations 1126, which is 1127 in FIG. 11*a*, and places generated code inside increment function 1125.

One embodiment of this invention is by creating a preprocessor to process human programming in JavaScript involving enumeration of client values, where programming for handling each enumerated value involves server operations. Referring to FIG. 12*a*, a JavaScript enumeration 1201 enumerates client values, programming 1202 involves server operations. Programming 1203 follows the enumeration. Referring to FIG. 12*b*, as stated by claim 5, the preprocessor generates code 1204 to declare an array "usedkeys" and initialized it to an empty array; the preprocessor generates an "afterLoop" function 1209; the preprocessor processes programming 1210 and places generated code inside "afterLoop" function 1209, programming 1210 in FIG. 12*b* is programming 1203 in FIG. 12*a*; the preprocessor generates a "loop" function 1205 for implementing the enumeration; inside function 1205 is a coding 1206 which uses array "usedkeys" and the enumeration to find an unused key; if an unused key is found then the found key is pushed into array "usedkeys" followed by code generated by the preprocessor processing code 1207, programming 1207 includes programming for handling each enumerated value, which is programming 1202 in FIG. 12*a*, and a recursive call to "loop" function 1205; the enumeration breaks if an unused key is found; if an unused key is not found then a function call 1208 executes "afterLoop" function 1209.

Figure 13B:
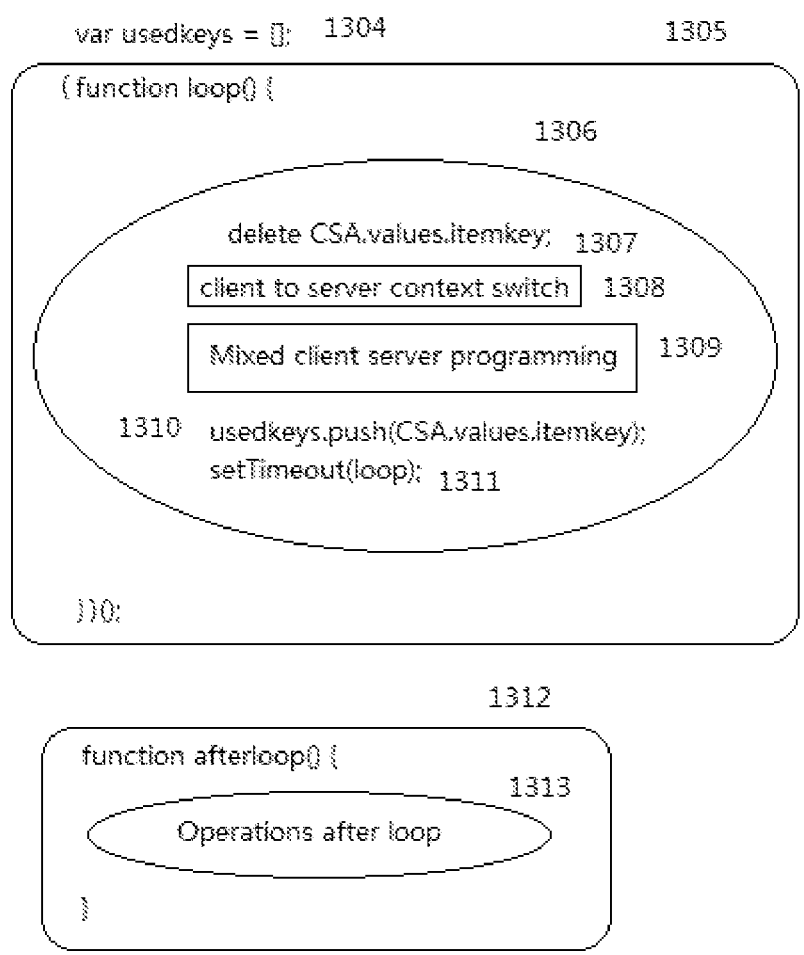

One embodiment of this invention is by creating a preprocessor to process human programming in JavaScript involving enumeration of server values, where programming for handling each enumerated value involves client operations. Referring to FIG. 13*a*, a JavaScript enumeration 1301 enumerates server values, programming 1302 involves client operations. 1302 is the "handling code" referred to in claim 6. Programming 1303 follows the enumeration. Referring to FIG. 13*b*, as stated by claim 6, the preprocessor generates code 1304 to declare an array "usedkeys" and initialized it to an empty array; the preprocessor generates an "afterLoop" function 1312; the preprocessor processes programming 1313 and places generated code inside "afterLoop" function 1312, programming 11313 in FIG. 13*b* is programming 1303 in FIG. 13*a*; the preprocessor generates a "loop" function 1305 for implementing the enumeration; the preprocessor processes programming 1306 and places generated code inside function 1305; programming 1306 includes 1307 which deletes a used key from download value list, 1308 which makes a client to server execution context switch, 1309 which is 1302 in FIG. 13*a*, 1310 which pushes used key from download value list to "usedkeys" array, and 1311 which is a recursive call to "loop" function 1305. Referring to FIG. 13*c*, as stated in claim 6, a process re-arranges server code of the first server connection, code 1318 is generated by the preprocessor, the process of claim 6 wraps code 1318 in an enumeration 1314, and enumeration 1314 is the same enumeration 1301 in FIG. 11*a*; before code 1318, the process generates code to find an unused key using "usedkeys" array which is uploaded in the server connection, if an unused key is found then the found key is pushed into download value list using an application programming interface provided by the server side dispatcher which is "jsServer" in 1317, after code 1318, the enumeration breaks at 1319, that is, the server enumeration breaks if an unused key is found; if an unused key is not found then the enumeration is finished. Referring to FIG. 13*d*, as stated in claim 6, the process of claim 6 modifies code generated by the preprocessor by modifying the first callback function 1320; callback function 1320 and code 1322 are generated by the preprocessor; the process of claim 6 adds a condition checking 1321 which checks the existence of used key in download values; if used key existence then code 1322 is executed; if used key does not existence then function call 1323 is executed to call function "afterLoop" which is 1312 in FIG. 13*b*.

Figure 14B:
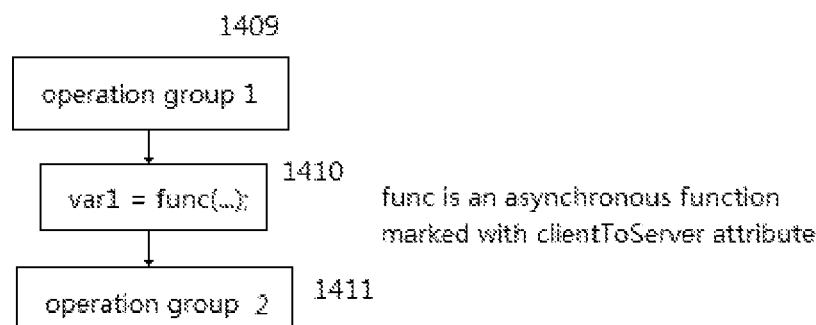
Figure 14C:
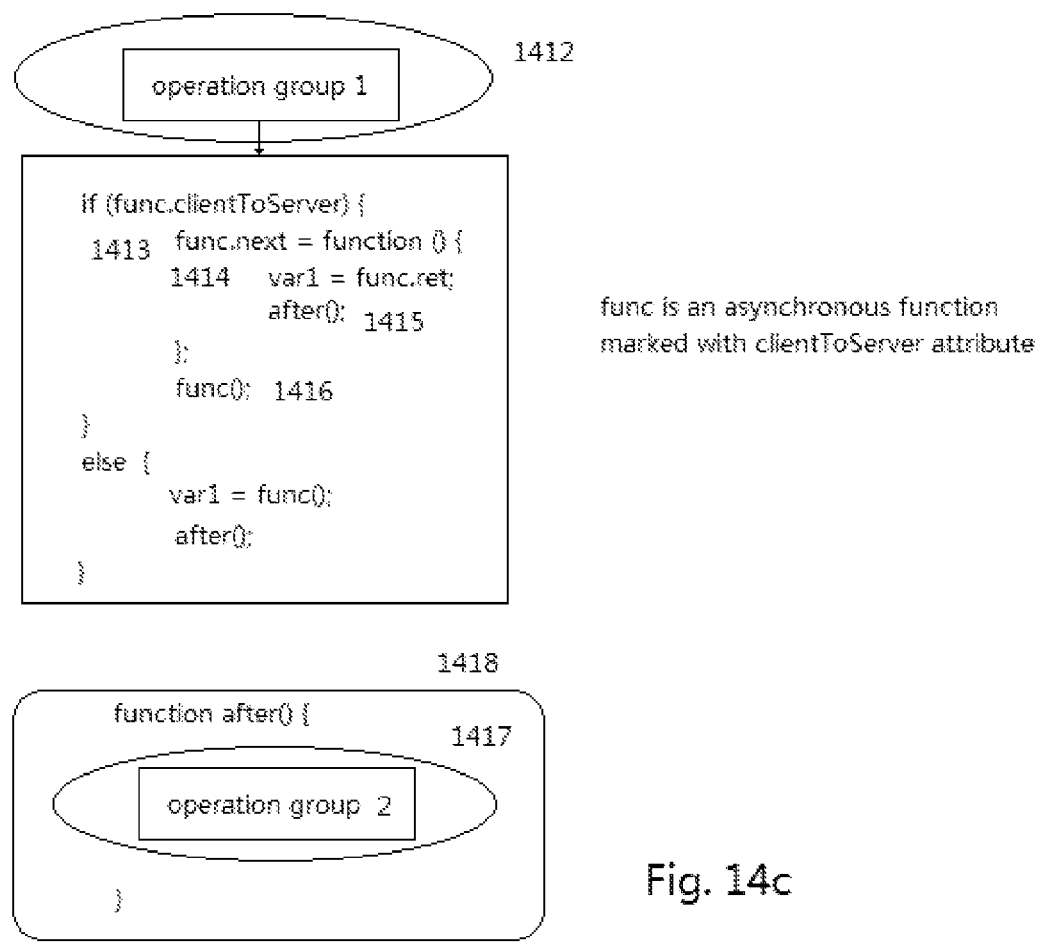

One embodiment of this invention is by creating a preprocessor to process human programming in JavaScript involving a client function, where programming for such a client function involves server operations. Referring to FIG. 14*a*, as stated in claim 7, code 1401 is generated by the preprocessor to set "run type attribute" of the function to indicate that the function is client to server asynchronous function, in FIG. 14*a*, "run type attribute" is a Boolean JavaScript property of the function named "clientToServer". Code 1403, code 1405 and callback function 1404 are generated by the preprocessor processing programming inside the client function. As stated in claim 7, the process of claim 7 appends code 1406 to the end of the last callback function 1404. The process of claim 7 appends code 1407 to code 1405; code 1407 assigns return value of the function to an "return value attribute" of the function, in FIG. 14*a*, the "return value attribute" is a JavaScript property of the function named "ret"; following code 1407, the process adds code 1408 which execute a function assigned to a JavaScript property named "next" of the function, if such a function exists. FIG. 14*b* shows a programming to be processed by the preprocessor; the programming includes a call to a function which is a client to server asynchronous function. Referring to FIG. 14*c*, the preprocessor generates code 1412 by processing operation group 1; the process of claim 8 generates function "after" 1418, code 1417 is generated by the preprocessor processing operation group 2. Referring to FIG. 14*c*, the process of claim 8 generates code 1413 which assigns an anonymous function to a JavaScript property named "next" of the function; the anonymous function uses code 1414 to retrieve function return value and assign it to the variable specified in programming 1410 in FIG. 14*b*; the anonymous function uses code 1415 to call function "after" 1418; after setting "next" property of the function the process of claim 8 adds a call 1416 to the function.

Figure 16:
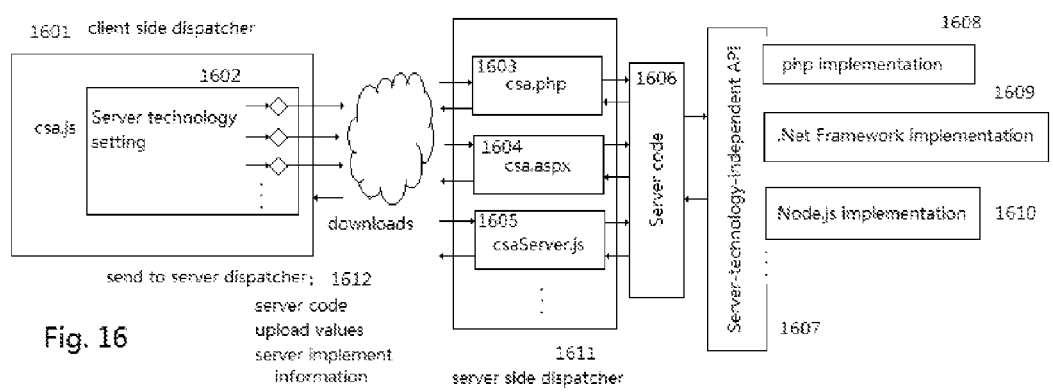
FIG. 16 shows a structure of execution environment for client-server-automation consists of a client side dispatcher and 3 sample server side dispatchers. It shows how "server-technology-independent API" works.

One embodiment of this invention is by creating a process of computer programming without mandatorily distinguishing server technologies. Referring to FIG. 16, a JavaScript file csa.js is created to be the client side dispatcher 1601, as stated in claim 1. The client side dispatcher 1601 has a server technology setting 1602 which specifies which server side dispatcher 1611 should be connected when making a client to server connection. One embodiment of this invention is by creating a server side dispatcher csa.php 1603 which runs PHP implementation 1608; 1608 implements "server-technology-independent API" 1607 using PHP technology. One embodiment of this invention is by creating a server side dispatcher csa.aspx 1604 which runs ASPX implementation 1609; 1609 implements "server-technology-independent API" 1607 using ASPX and Microsoft® Net Framework. One embodiment of this invention is by creating a server side dispatcher csaServer.js 1605 which runs Node.js implementation 1610; 1610 implements "server-technology-independent API" 1607 using Node.js. Client side dispatcher csa.js 1601 sends server code, upload values and server implement information 1612 to a corresponding server side dispatcher 1611. For server side dispatcher 1603, the server implement information includes PHP file names implementing those parts of 1608, which are used in the server code 1606. For server side dispatcher 1604, the server implement information includes type information and DLL path for those parts of 1609, which are used in the server code 1606. For server side dispatcher 1605, the server implement information includes JavaScript file names implementing those parts of 1610, which are used in the server code 1606.

All example files submitted are text files using extension txt; actual file extension follows an underscore. For example, csaServer.js is submitted as csaServer_js.txt, DbExecuter.cs is submitted as DbExecuter_cs.txt, mailPage.html is submitted as mailPage_html.txt, etc.

An example of Client-Server-Automation preprocessor is tested under Microsoft Windows® 8.0 with Internet Information Server® enabled. Examples of client side JavaScript files and server side JavaScript files generated by that Client-Server-Automation preprocessor are tested with following web browsers under Microsoft Windows® 8.0: Internet Explorer® 10 from Microsoft Corporation, Mozilla Firefox® 37.0.2 from Mozilla, Opera® 12.17 from Opera Software, Safari® 5.1.7 from Apple Inc., Chrome® 42.0.2311.90 from Google Corporation.

Example 1

Source code—file name: csa_js.txt. The file is source code for a client side dispatcher as defined in claim 1, implemented in JavaScript. It is 102 in FIG. 1, 203 in FIG. 2, 303 in FIG. 3, 403 in FIG. 4, 603 in FIG. 6, 707 in FIG. 7, and 1601 in FIG. 16. Referring to line 6, the source code defines an object named CSA to act as the client side dispatcher to implement the inventions presented in claim 1.

Line 12 defines a property of the client side dispatcher named ServerFile. The property acts as a setting to indicate which server side dispatcher is to be used, as stated in claim 1. The embodiments of this invention provide 3 kinds of server side dispatchers to support PHP, ASPX, and Node.js, respectively.

Lines 107 to 459 define a function callServer for making a client to server connection to a server side dispatcher.

Line 361 checks whether the server technology setting ServerFile is "node". If ServerFile is "node" then the web server is Node.js running csaServer.js, the server side dispatcher is csaServer.js. Lines 362 to 380 define a function checkSocketIo for client side dispatcher csa.js to support Node.js as server technology. Line 381 executes checkSocketIo. Function checkSocketIo uses socket.io to connect to csaServer.js and sends a message "csa" to csaServer.js. The variable data is an object containing upload values, server code, and server implement information, as defined in claim 1. Referring to line 374 a debug flag is inserted at the beginning of data if debug mode is enabled. Referring to lines 369 and 370, it sets up an event handler for a "csa" event; "csa" event is fired by csaServer.js on finishing executing a server code requested by the client side dispatcher csa.js; line 370 in the event handler calls function _processServerResponse to process downloaded values and execute callback function.

Lines 383 to 458 handle situations where ServerFile is not "node". Variable xmlhttp is created for doing AJAX connection to a server side dispatcher. Line 431 uses ServerFile to form an URL for the server side dispatcher. The variable data is an object containing upload values, server code, and server implement information, as defined in claim 1. Line 453 sends data to the server side dispatcher with a debug flag. Line 456 sends data to the server side dispatcher without a debug flag. The embodiments of this invention support using PHP as server technology by setting ServerFile to a PHP file named "csa.php" and support using ASPX as server technology by setting ServerFile to an ASPX file named "csa.aspx".

The JSON string made from variable data used in line 374, 377, 453 and 456 is the JSON data 204 in FIG. 2, 304 in FIG. 3, 404 in FIG. 4, and 604 in FIG. 6.

Lines 395 to 430 define an anonymous function to handle AJAX response. The function reports errors and timeout. Line 401 calls _processServerResponse to process downloaded values and execute callback function.

Lines 167 to 326 define a function _processServerResponse for processing responses from a server side dispatcher. A server response may contain debug information; line 170 to 203 show debug information in a popup window. Line 235 parses JSON string r to a JavaScript JSON object, which is 205 in FIG. 2, 305 in FIG. 3, 405 in FIG. 4, and 605 in FIG. 6. Line 297 calls a function _imitateScope, passing download values; this is for preparing client execution scope before executing a callback function, as stated in claim 1. This client side dispatcher csa.js supports several ways of executing callback functions. Lines 307 to 314 execute code downloaded from server. Lines 320 to 322 execute a callback function specified in an object containing data for making a connection to a server side dispatcher. Lines 323 to 325 execute a callback function passed into function callServer; function callServer of this client side dispatcher is used for client side code to make a client to server connection.

Lines 158 to 166 define a function _imitateScope for imitating client execution scope for a callback function. Server values can be assigned to client variables; such server values become download values; download values are passed into _imitateScope; line 163 assigns each download value to a client variable, thus, the values of these client variables have server values, therefore, these server values are accessible by a client callback function as if the server code are in the scope of client code.

Example 2

Source code—file name: csa_aspx.txt. This file is to be connected via AJAX from a client side dispatcher, such as shown by Example 1; it represents a server side dispatcher using ASPX as server technology; it invokes code behind DLL which is csa.dll. csa.dll is compiled from following files: JavaScriptServer_cs.txt, IServerObject_cs.txt, WebClientRequestEx_cs.txt. csa.dll references WebServerProcessor.dll which is compiled from following files: CookieCollection_cs.txt, IDatabase_cs.txt, IFileUploader_cs.txt, Json_cs.txt, WebAppAspx_cs.txt, WebRequestProcessor_cs.txt.

Source code—file name: JavaScriptServer_cs.txt, line 20 defines a class, JavaScriptServer, derived from System.Web.UI.Page. This is one of files to be compiled into csa.dll.

Lines 226 to 282 define an override function OnLoad. When csa.dll is invoked by csa.aspx, a System.Web.UI.Page instance of type JavaScriptServer is created and OnLoad method is executed.

Lines 277 and 278 parse JSON string uploaded from a client side dispatcher; result of parsing is stored in a variable clientRequest of type WebClientRequestEx. WebClientRequestEx is defined in a file named WebClientRequestEx_cs.txt Line 31 initializes a variable _js of type JScriptEngine; JScriptEngine is a class provided by Microsoft® ClearScript.DLL. It is used to execute server side JavaScript code.

Lines 285 to 286 add the server side dispatcher to JScriptEngine _js. A server side dispatcher provides an interface for server code to add download values to server response.

Lines 288 to 311 use "server implement information" to load assemblies required by executing server code. The "server implement information" is stored in clientRequest.ServerTypes. Line 299 resolve one type of the "server implement information"; the type is part of "server-technology-independent API" implemented in Microsoft®.Net Framework; the type is needed for the server code specified by the client side dispatcher.

Line 312 creates a variable sevrercode to form server code uploaded from the client side dispatcher.

Line 319 includes uploaded client values to be used to imitate execution scope for server code.

Lines 320 to 330 include used keys array uploaded from client side for supporting server value enumeration.

Lines 332 to 361 include server side JavaScript files specified by the client side dispatcher; the server side JavaScript files are generated by a client-server-automation preprocessor for the current server connection.

Lines 363 to 366 include server code specified by the client side dispatcher.

Line 367 executes server code.

Line 372 sends server response to the client side dispatcher.

Example 3

Source code—file name: csa_php.txt. This file is to be connected via AJAX from a client side dispatcher such as shown by Example 1; it represents a server side dispatcher using PHP as server technology.

Lines 69 to 220 define a class csaPhp. This class acts as a server side dispatcher.

Lines 88 to 219 define a function ProcessClientRequest. Line 124 parses JSON text uploaded from the client side dispatcher into a variable jsonFromClient.

Lines 170 to 191 form server side JavaScript code specified by the client side dispatcher. Lines 172 to 179 load server side JavaScript libraries according to ServerTypes which is the "server implement information" specified by the client side dispatcher for those parts of PHP implementation of the "server-technology-independent API" which are needed by the server code for the current server connection. Lines 180 to 187 load server side JavaScript files generated by a client-server-automation preprocessor for the current server connection. Lines 188 to 191 include server side JavaScript code specified by the client side dispatcher.

Line 198 creates a V8Js object for executing server side JavaScript code specified by the client side dispatcher.

Line 200 executes the server side JavaScript code.

Lines 201 to 205 prepares download values.

Line 211 sends server response to the client side dispatcher.

Line 222 creates an instance of class csaPhp which is a server side dispatcher.

Line 223 executes function ProcessClientRequest on the instance of casPhp for carrying out tasks of a server side dispatcher.

Example 4

Source code—file name: csaServer_js.txt. This is a web server to be executed by Node.js. It is also a server side dispatcher.

Lines 38 to 133 define an event handler for event "csa". A client side dispatcher generates a "csa" event when connecting from client to server. This event handler performs tasks of server side dispatcher.

Line 52 parses JSON text uploaded from the client side dispatcher into a variable clientData.

Lines 82 to 90 prepares client values needed by the server code so that a proper execution scope for the server code can be imitated.

Lines 92 to 107 prepares the server code to be executed.

Lines 93 to 98 include server side libraries in the server code, according to ServerTypes which is the "server implement information" specified by the client side dispatcher for those parts of Node.js implementation of the "server-technology-independent API" which are needed by the server code for the current server connection.

Lines 99 to 104 include server side JavaScript files generated by a client-server-automation preprocessor for the current server connection.

Lines 105 to 107 include server side JavaScript code specified by the client side dispatcher.

Lines 110 to 118 use a closure to form an interface of server side dispatcher for the server code to add download values to server response.

Line 120 executes the server code.

Lines 121 to 123 include download values generated by the execution of the server code to the server response.

Lines 127 to 132 generates a client event "csa" to send the server response to the client side dispatcher.

Example 5

Source code—file name: mailtool_js.txt. This file shows an example of "server-technology-independent API" for sending emails.

Line 3 sets a flag to indicate that the library runs at server. A client-server-automation preprocessor uses this flag to distinguish server operations from client operations.

Line 4 provides server-implement-information for the library. The information is included in server connections generated by a client-server-automation preprocessor; a server connection connects to a server side dispatcher; the server side dispatcher uses the server-implement-information to load implementation libraries.

Lines 8 to 12 define a function "send" for sending an email. The function acts as an interface. Line 9 creates a variable of type MailSender; MailSender is a server technology implementation of the interface. This implementation should be loaded via the "server implement information" by a server side dispatcher; the "server implement information" is ['webMail.MailSender'] in this case as shown in line 4.

Lines 13 to 15 define a function "ErrorMessage" for getting error message for the last execution of "send" function. The function acts as an interface.

Example 6

Source code—file name: database_js.txt. This file shows an example of "server-technology-independent API" for database operations.

Line 3 sets a flag to indicate that the library runs at server. A client-server-automation preprocessor uses this flag to distinguish server operations from client operations.

Line 4 provides server-implement-information for the library. The information is included in server connections generated by a client-server-automation preprocessor; a server connection connects to a server side dispatcher; the server side dispatcher uses the server-implement-information to load implementation libraries.

Lines 12 to 14 define an interface function "setCommand" for setting a database command to be executed.

Lines 15 to 17 define an interface function "clearParameters" for removing all database command parameters.

Lines 18 to 21 define an interface function "addParameter" for adding a parameter to be used in executing a database command.

Lines 24 to 35 define an interface function "execute" for executing a database command. Line 26 creates an instance of type DbExecuter. DbExecuter is a server technology implementation of the interface. This implementation should be loaded via the "server implement information" by a server side dispatcher; the "server implement information" is ['Database.DbExecuter'] in this case as shown in line 4.

Lines 36 to 38 define an interface function "LastAutoNumber" for retrieving an auto-number generated by the last "Insert" command executed by a call to the "execute" function.

Lines 39 to 41 define an interface function "LastErrorMessage" for getting an error message generated by the last failed function call.

Example 7

Source code—file name: WebMail_cs.txt. This file shows an example of implementing "server-technology-independent API" represented by mailtool.js for sending emails. This is an ASPX implementation for supporting mailtool.js. Function "send" in mailtool.js requires a MailSender object which is supposed to be implemented in each supported server technology. WebMail_cs.txt uses C# to implement MailSender for the server technology of ASPX.

Line 8 specifies namespace to be "WebMail". Line 10 specifies class name to be "MailSender". The full name for the class is WebMail.MailSender. Note that in mailtool.js, the "sever implement information" is "WebMail.MailSender". By naming the class as WebMail.MailSender the server side dispatcher for ASPX can load the class when mailtools.js is used by server code.

Lines 23 to 41 define a function "Send". This function is an implementation of sending emails by server technology of ASPX. Line 32 creates a SmtpClient object named smtp. Line 33 calls Send method of object smtp.

Example 8

Source code—file name: DbExecuter_cs.txt. This file shows an example of implementing "server-technology-independent API" represented by database.js for executing database commands. This is an ASPX implementation for supporting database.js. Function "execute" in database.js requires a DbExecuter object which is supposed to be implemented in each supported server technology. DbExecuter_cs.txt uses C# to implement DbExecuter for the server technology of ASPX. DbExecuter_cs.txt and DbParameter_cs.txt compiled into a DLL file.

Line 8 specifies namespace to be "Database". Line 10 specifies class name to be "DbExecuter". The full name for the class is Database.DbExecuter. Note that in database.js, the "sever implement information" is "Database.DbExecuter". By naming the class as Database.DbExecuter the server side dispatcher for ASPX can load the class when database.js is used by server code.

Lines 132 to 174 define a function "Execute". This function is an implementation of database operation for server technology of ASPX.

Line 138 creates an OLEDB database connection using a hardcoded connection string. For a generic library, this line should be changed to fetch a connection string based on variable "_connectionId". The connection type should also be based on "_connectionId", not hardcoded as an OLEDB connection.

Line 139 creates a database command. Line 140 specifies database operation to be executed.

Lines 141 to 148 applies parameters.

Line 149 opens database connection.

Line 150 executes the database command.

Lines 151 to 157 retrieves an auto-number. The way to retrieve an auto-number varies for different kinds of database engines. Lines 151 to 157 show a way for Microsoft Access database. To support different kinds of databases, "_connectionId" can be used to branch to code corresponding to appropriate database engine.

Example 9

Figure 15:
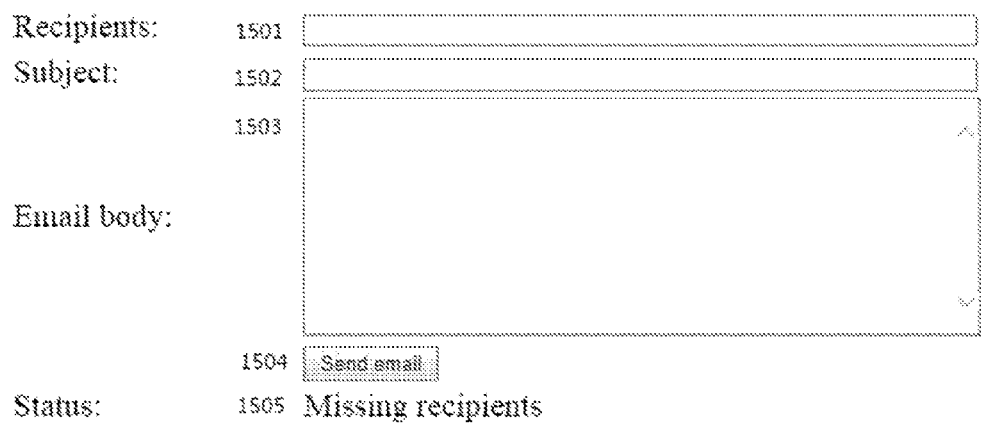
FIG. 15 shows a sample web page for sending a web email.

Html design and programming file—mailPage_html.txt. This is a sample web page as shown in FIG. 15. A text box 1501 is used for entering email addresses as recipients; a text box 1502 is used for entering email subject; a text area 1503 is used for entering email body; a button 1504 is used for triggering the sending of an email; a label 1505 is used for showing validation errors and email sending errors.

Line 6 includes a JavaScript file database.js. The file represents a part of "server-technology-independent API" for executing database commands.

Line 7 includes a JavaScript file mailtool.js. The file represents a part of "server-technology-independent API" for sending emails from a web page.

Lines 44 to 86 define a function "sendMail". Line 101 assigns "sendMail" to a button's onclick attribute. The button is 1504 on FIG. 15. Function "sendMail" mixes client operations and server operations. Client side and server side programming boundary disappears in such a function, as described below.

Line 45 calls a client function for validating user inputs.

Lines 46, 47 and 48 retrieve user inputs into 3 client side variables.

Line 49 creates a Database object Db1. The function Database is provided by JavaScript file database.js included in the HTML file. This is a server object but the programmer does not need to care about it: there is not a boundary between client side programming and a server side programming.

Line 50 specifies a database command to be executed.

Lines 51 to 54 specify parameters for the database object. Note that for this server side object the parameter values are client side values. Again, it shows disappearing of a boundary between client side programming and a server side programming.

Line 55 executes the database command. Line 83 shows database error message on the web page if database command fails. Note that the error message is from server and it is displayed on a client side label. It shows disappearing of a boundary between client side programming and a server side programming.

Line 57 creates a SendMail object Email1. The function SendMail is provided by JavaScript file mailtool.js included in the HTML file. This is a server object but the programmer does not need to care about it: there is not a boundary between client side programming and a server side programming.

Line 58 executes "send" function of object Email1 using user inputs. Note that Email1 is a server object and "send" function is executed at server side; the parameters provided to the "send" function are client side values. It shows disappearing of a boundary between client side programming and a server side programming.

Line 59 creates another Database object Db2.

Lines 60 to 62 specify database command and parameters for Db2.

Line 63 executes the database command, which update the database record with error message from sending email. The record to be updated is identified via Db1.LastAutoNumber.

Lines 64 to 69 form error message from database error and mail sender error.

Line 70 displays the error message in a label on the web page. Note that the error message is from the server and the label is at client. It shows disappearing of a boundary between client side programming and a server side programming.

Lines 71 to 80 make another database updating to mark the ending of sending an email.

Line 72 creates a new Database object Db3.

Lines 73 to 75 specify database command and parameters for Db3.

Line 76 executes the database command, which update the database record with a date time of the client web page to mark the finish of sending the email. The record to be updated is identified via Db1.LastAutoNumber.

Line 78 displays database error message of executing Db3 in a label on the web page. Note that the error message is from the server and the label is at client. It shows disappearing of a boundary between client side programming and a server side programming.

Comparing with asynchronous RPC, advantages of programming of lines 44 to 86 are obvious. 1. Disappearing of a boundary between client side programming and server side programming makes coding simple and shows clear business logic. 2. A group of server operations, such as lines 49 to 55, use one network connection to execute, instead of using one network connection for each RPC call. 3. Asynchronous server code execution is used for web page responsiveness but synchronous programming syntax is used for clear business logic.

Example 10

Generated Html file—mailPage_p_html.txt. This is a web page named as mailPage_p.html. This is a web page generated by a client-server-automation preprocessor from processing web page mailPage.html, submitted as mailPage_html.txt. Naming the web page file as mailPage_p.html instead of using the original file name mailPage.html is only for clarity on explaining processes defined in claims. In an actual production distribution, the generated file may use the original file name and take precautions to prevent from overwriting the original files with generated files.

Line 7 includes a client side dispatcher to the web page because the web page mailPage_html.txt contains server side operations. A client side dispatcher is needed for running client-server-automation.

Line 8 includes a client side JavaScript file, mailPage_client.js, to the web page. The client side JavaScript file is generated by a client-server-automation preprocessor. The file mailPage_client.js is submitted as a file named mailPage_client_js.txt for this application.

Example 11

Processing of JavaScript code in web page mailPage_html.txt by a client-server-automation preprocessor generates following files as FIG. 5 shows: web page file mailPage_p_html.txt which is described in Example 10, client side JavaScript file mailPage_client_js.txt, server side JavaScript files mailPage_server1_js.txt and mailPage_server2_js.txt. A preprocessor generates 2 server side JavaScript files because it generates two server connections.

Lines 5 to 36 of maiPage_client_js.txt are client JavaScript code in the original HTML file mailPage_html.txt. The code is identified by a client-server-automation preprocessor to be client code.

Lines 37 to 87 of maiPage_client_js.txt define a function "sendMail" generated by a client-server-automation preprocessor processing the original function "sendMail" in JavaScript code included in the web page mailPage_html.txt.

Lines 38 to 41 of maiPage_client_js.txt are original code from line 45 to 48 in mailPage_html.txt, these lines do not involve server values and server operations, and default execution context is assumed to be client execution context.

Line 49 in the original web file mailPage_html.txt is identified by a client-server-automation preprocessor to be a server operation because function Database has a flag indicating that it is server side function, see line 3 in database_js.txt. Because the current execution context is client and statement of line 49 in the original web file mailPage_html.txt is a server operation, a client-server-automation preprocessor thus identifies that there is a client to server execution context switching point before line 49 in the original web file mailPage_html.txt, as stated in claim 1. As stated in the process of processing sequential operations, a client-server-automation preprocessor removes this client to server execution context switching point by generating a client to server connection using the client side dispatcher, csa.js, included in line 7 of mailPage_p_html.txt, as shown in line 45 to 50 in mailPage_client_js.txt.

Line 68 of maiPage_client_js.txt makes a client to server connection by calling callServer function of the client side dispatcher.

Lines 69 to 72 of maiPage_client_js.txt specify "server implement information". In this case, it is ['Database.DbExecuter', 'WebMail.MailSender'] indicating two server side objects to be used. 'Database.DbExecuter' is ServerTypes attribute of function Database, as shown in line 4 of database_js.txt; 'WebMail.MailSender' is ServerTypes attribute of function SendMail, as shown in line 4 of mailtool_js.txt.

Lines 73 to 77 of maiPage_client_js.txt specify server side JavaScript files to be used. In this case, they are ['database.js', 'mailtool.js', 'mailPage_server1.js']. A client-server-automation preprocessor specifies 'database.js' and 'mailtool.js' here because they are included in mailPage_html.txt and used by the server code; these include files are the server side library files defining parts of "servertechnology-independent API" used by the server code to be executed, as stated in claim 1. Another server side JavaScript file 'mailPage_server1.js' is the server code to be executed. 'mailPage_server1.js' is generated by a client-server-automation preprocessor from lines 49 to 55 in the original web file mailPage_html.txt because they are server operations following the identified client to server execution context switching point, as stated in the process of processing sequential operations.

Lines 78 to 83 of maiPage_client_js.txt specify client values to be uploaded. In this case they are {subject: subject, mailbody: mailbody, recipients: recipients, v87leox: CSA.datetime.tolso(Date( ))}. A client-server-automation preprocessor identifies these upload values because these client values are used in server operations for this client to server connection. Referring to mailPage_html.txt, subject is used at line 51, mailbody is used at line 52, recipients is used at line 53, and Date( ) is used at line 54.

Line 85 of maiPage_client_js.txt passes a callback-function named callback_nvzszq to method callServer of the client side dispatcher. The callback-function callback_nvzszq is generated by a client-server-automation preprocessor.

Referring to lines 56 to 84 in the original web file mailPage_html.txt, a client-server-automation preprocessor identifies a server to client execution context switching point as stated in claim 3, because line 56 is a code branching condition at server execution context, line 57 is the first programming statement which is a server operation and one code branch at line 83 is a client operation, therefore according to claim 3 a preprocessor identifies the code branching to be situation 2. Thus, a callback function is generated, which is named as callback_nvzszq. The code branching is duplicated at server code and the client callback function callback_nvzszq. Referring to line 43 in mailPage_client_js.txt, the code branching is generated in the client callback function callback_nvzszq. Referring to line 13 in mailPage_server1_js.txt, the code branching is generated in the server code for the client to server connection.

Referring to lines 57 to 69 in the original web file mailPage_html.txt, these are server operations at the beginning of a code branch at server execution context, thus, a client-server-automation preprocessor collects these code in the server code mailPage_server1_js.txt under the same code branch, as shown in lines 14 to 26 in mailPage_server1_js.txt, as stated in claim 3.

Referring to line 70 in the original web file mailPage_html.txt, it is a client operation in a code branch following server operations. As stated in claim 3, referring to line 44 in mailPage_client_js.txt which is generated by a client-server-automation preprocessor, the client operation of line 70 in the original web file mailPage_html.txt becomes the first operation of a duplicated code branch in callback function callback_nvszq.

Referring to lines 27 and 30 in file mailPage_server1_js.txt, server value dberr is added to download value list by a client-server-automation preprocessor because dberr is used in client operations at lines 70 and 83 in file mailPage_html.txt. Referring to line 28 in file mailPage_server1_js.txt, server value Db1.LastAutoNumber( ) is added to download value list by a client-server-automation preprocessor because it is used in line 75 in mailPage_html.txt, line 75 is in a subsequent server connection and thus a client-server-automation preprocessor identifies it as a state-value.

Referring to line 71 in mailPage_html.txt, it is a code branching condition. The code before line 71 is in client execution context, line 71 involves a server value, Db1.LastAutoNumber( ). As stated in claim 3, a client-server-automation preprocessor treats Db1.LastAutoNumber( ) as a client value downloaded from server and there is not an execution context switching point at line 71. Referring to line 45 in generated code mailPage_client_js.txt, a code branching condition is generated using downloaded value.

Referring to line 72 in mailPage_html.txt, it is a server operation and the current execution context is client, thus a client-server-automation preprocessor identifies a client to server execution context switching point. Referring to lines 51 to 62 of generated code mailPage_client_js.txt, a client-server-automation preprocessor generates a client to server connection by calling callServer function of a client side dispatcher.

Line 52 of mailPage_client_js.txt specifies "server implement information". In this case, it is ['Database.DbExecuter'] indicating server sides object to be used. 'Database.DbExecuter' is ServerTypes attribute of function Database, as shown in line 4 of database_js.txt.

Lines 53 to 56 of maiPage_client_js.txt specify server side JavaScript files to be used. In this case, they are ['database.js', 'mailPage_server2.js']. A client-server-automation preprocessor includes 'database.js' because it is included in mailPage_html.txt and function Database defined in the file is used in the server code; the include file is a server side library file defining parts of "server-technology-independent API" used by the server code to be executed. Another server side JavaScript file 'mailPage_server2.js' is the server code to be executed. 'mailPage_server2.js' is generated by a client-server-automation preprocessor from lines 72 to 76 in the original web file mailPage_html.txt because they are server operations following the identified client to server execution context switching point.

Lines 57 to 60 of maiPage_client_js.txt specify client values to be uploaded. In this case they are {vyxmvx5: CSA.datetime.tolso(Date( )), vyvfpv9: CSA.values.LastAutoNumber}. A client-server-automation preprocessor identifies these upload values because these client values and state-values are used in server operations for this client to server connection. Referring to mailPage_html.txt, Date( ) is used at line 74, state-value Db1.LastAutoNumber( ) is used at line 75.

Line 62 of maiPage_client_js.txt passes a callback-function named callback_3bk4ub to method callServer of the client side dispatcher. The callback-function callback_3bk4ub is generated by a client-server-automation preprocessor.

Referring to lines 72 to 76 of mailPage_html.txt, these are server operations. A client-server-automation preprocessor collects these server operations into lines 5 to 10 of a server side JavaScript file, mailPage_server2_js.txt.

Referring to line 7 of mailPage_server2_js.txt, variable vyxmvx5 is a client value uploaded via line 58 of mailPage_client_js.txt.

Referring to line 8 of mailPage_server2_js.txt, variable vyvfpv9 is a state-value uploaded via line 59 of mailPage_client_js.txt.

Referring to line 10 of mailPage_server2_js.txt, a server value dberr2 is added to download list. A client-server-automation preprocessor adds this line because dberr2 is used in a subsequent client operation at line 78 of mailPage_html.txt.

Referring to line 77 of mailPage_html.txt, it is a code branching condition. It is at server execution context, it has only one code branch and the first programming statement is at line 78 which is a client operation, thus by claim 3, a client-server-automation preprocessor identifies that it is a situation 1 code branching, there is a server to client execution context switching point before the code branching, and the code branching is placed in a client callback function callback_3bk4ub. Referring to line 47 in mailPage_client_js.txt, the code branching condition is placed in callback function callback_3bk4ub.

Referring to line 78 of mailPage_html.txt, it is a client operation involving a server value; referring to 65 of mailPage_client_js.txt, a client-server-automation preprocessor uses download value for the server value used to fulfill line 78 of mailPage_html.txt.

Example 12

Source code—file name: serverA_js.txt. This file shows an example of a part of "server-technology-independent API" for providing some sample server side functions.

Line 4 sets a flag to indicate that function serverTaskX is a server side object.

Line 5 specifies "server implement information" for the library. In this sample, it is ['ServerTasks.ServerTaskX'].

Lines 11 and 17 use a class of ServerTaskX which is supposed to be implemented in various supported server technologies.

Example 13

Source code—file name: ServerTaskX_cs.txt. This file shows an example of implementing "server-technology-independent API" represented by serverA.js. This is an ASPX implementation for supporting serverA.js. A function serverTaskX is provided in API server_js.txt, the function creates an object which uses a ServerTaskX object. The ServerTaskX object must be implemented in all supported server technologies. To support ASPX, this file ServerTaskX_cs.txt should be compiled into a DLL file named ServerTasks.DLL because the "server implement information" in serverA_js.txt is specified as ['ServerTasks.ServerTaskX'].

Example 14

Source code—file name: ServerTasks.ServerTaskX_js.txt. This file shows an example of implementing "server-technology-independent API" represented by serverA.js. This is a JavaScript implementation for supporting serverA.js. This JavaScript implementation can be used under Node.js running csaServer.js. A function serverTaskX is provided in API serverA_js.txt, the function creates an object which uses a ServerTaskX object. The ServerTaskX object must be implemented in supported server technologies. To support Node.js, this file ServerTasks.ServerTaskX_js.txt is so named because the "server implement information" in serverA_js.txt is specified as ['ServerTasks.ServerTaskX'].

Example 15

Html design and programming file—loop_html.txt. This is a web page showing a sample of using server operations in a code looping.

Line 42 is a button for executing a JavaScript function function1.

Lines 8 to 37 define a function function1. The function includes two nested loops. There are server operations inside the inner loop. A client-server-automation preprocessor uses a process described in claim 4 to process the function.

Lines 14 to 33 form an outer loop.

Lines 15 to 28 form an inner loop.

Lines 19 to 21 are server operations. These server operations appear in a client side function and use client values. Such programming show disappearing of a boundary between client side programming and server side programming.

Lines 19 to 21 use a server object serverTaskX which is defined in an included JavaScript file "serverA.js" at line 5. Referring to line 4 of serverA_js.txt, a client-server-automation preprocessor knows that serverTaskX is a server object. Referring to Example 13 and Example 14, serverA_js.txt is supported for ASPX and Node.js. Thus, web page loop_html.txt can be used in ASPX web environment and in Node.js running csaServer.js.

Example 16

Processing of JavaScript code in web page loop_html.txt by a client-server-automation preprocessor generates following files as FIG. 5 shows: web page file loop_p_html.txt which is described in Example 17, client side JavaScript file loop_client_js.txt and server side JavaScript file loop_server1_js.txt.

As shown in FIG. 11a and FIG. 11b, and described in claim 4, a code looping involving server operations is simulated with a recursive function by a client-server-automation preprocessor. Function function1 in loop_html.txt uses nested loops. Since server operations are used in an inner loop, both the inner loop and an outer loop need to be simulated with a corresponding recursive function. Referring to line 14 of loop_html.txt, it starts the outer loop; referring to line 15 of loop_client_js.txt, a client-server-automation preprocessor generates a recursive function "loop_h72qsh" for simulating the outer loop. Referring to line 15 of loop_html.txt, it starts the inner loop; referring to line 20 of loop_client_js.txt, a client-server-automation preprocessor generates a recursive function "loop_se70m1" for simulating the inner loop.

FIG. 11b depicts how a client-server-automation preprocessor processes a code loop shown in FIG. 11a. Referring to line 12 of loop_client_js.txt, a client-server-automation preprocessor creates a function loopScope_cft8sa corresponding to 1109 of FIG. 11b. Referring to line 13, a loop scope variable is declared and initialized, as shown by 1111 and 1112 of FIG. 11b. Referring to line 14 of loop_client_js.txt, it executes a loop function as shown by 1113 of FIG. 11b. Referring to line 15 of loop_client_js.txt, it defines a loop function as shown by 1114 of FIG. 11b.

Referring to lines 64 to 67 of loop_client_js.txt, a client-server-automation preprocessor creates a function after_dynpwa as shown by 1123 of FIG. 11b.

Referring to lines 61 to 63 of loop_client_js.txt, a client-server-automation preprocessor creates a function inc_ybuo75 as shown by 1125 of FIG. 11b.

Referring to line 16 of loop_client_js.txt, a client-server-automation preprocessor creates a code branching as shown by 1116 of FIG. 11b. Referring to line 58 of loop_client_js.txt, if the loop condition is not met then function after_dynpwa is executed as shown by 1119 of FIG. 11b. Referring to lines 17 to 56 of loop_client_js.txt, a client-server-automation preprocessor generates code for 1117, 1118 and 1121 as shown in FIG. 11b. Note that, in this case of loop_html.txt, Loop Condition B 1120 is empty, so 1118 leads to 1121 as shown in FIG. 11b. Since 1117 of FIG. 11b in this case is another code looping, a client-server-automation preprocessor again processes the code by a process of claim 4 in the same way as it processes the outer loop, as shown above.

Referring to line 17 of loop_client_js.txt, a client-server-automation preprocessor creates a function loopScope_2t8arn for the inner loop, as shown by 1109 of FIG. 11b. Referring to line 16, a loop scope variable is declared and initialized, as shown by 1111 and 1112 of FIG. 11b. Referring to line 19 of loop_client_js.txt, it executes a loop function as shown by 1113 of FIG. 11b. Referring to line 20 of loop_client_js.txt, it defines a loop function as shown by 1114 of FIG. 11b.

Referring to lines 49 to 55 of loop_client_js.txt, a client-server-automation preprocessor creates a function after_pvaws4 for the inner loop as shown by 1123 of FIG. 11b.

Referring to lines 46 to 48 of loop_client_js.txt, a client-server-automation preprocessor creates a function inc_ukgsv0 for the inner loop as shown by 1125 of FIG. 11b.

Referring to line 21 of loop_client_js.txt, a client-server-automation preprocessor creates a code branching as shown by 1116 of FIG. 11b. Referring to line 45 of loop_client_js.txt, if the loop condition is not met then function after_pvaws4 is executed as shown by 1119 of FIG. 11b.

Referring to lines 17 to 27 of original loop_html.txt, these lines are the Repeated Operations as shown by 1117 of FIG. 11b. Because Loop Condition B 1120 is empty, 1118 leads to 1121. 1118 in this case is a line of code of "inc_ukgsv( );", 1121 in this case is a line of code of "setTimeout (loop_se70m1);". Lines 17 to 27 of loop_html.txt followed by "inc_ukgsv( );" and "setTimeout(loop_se70m1);" form a sequential programming to be processed by a client-server-automation preprocessor according to claim 2 and the process of the processing sequential operations, and as depicted by FIG. 8, FIG. 9a and FIG. 9b; thus generated code is the code branch for "True" branch of Loop Condition A 1116 of FIG. 11b; the generated code is shown by lines 22 to 41 of loop_client_js.txt.

Referring to line 17 of loop_html.txt, it is a client operation; this line is followed by a server operation at line 19. Thus, a client-to-server execution context switching point is identified, as shown by 902a of FIG. 9a. Lines 19 to 21 of loop_html.txt are server operations, a client operation at line 23 follows these server operations; thus, a server-to-client execution context switching point is identified, as shown by 902b of FIG. 9a. Hence a pair of client-to-server and server-to-client execution switching points is identified. By a process of claim 2, a client-server-automation preprocessor removes the pair of context switching points by placing a client to server connection at one end of execution path; as lines 29 to 41 of loop_client_js.txt show; as 803 in FIG. 8 shows. By claim 2, the rest of programming following the pair of context switching points is to be processed into a callback function; as lines 23 to 28 of loop_client_js.txt show; as 805 in FIG. 8 shows.

Referring to line 17 of loop_html.txt, it forms 901 of FIG. 9a. Referring to lines 19 to 21 of loop_html.txt, they form 902 of FIG. 9a. Lines 23 to 27 followed by "inc_ukgsv( );" and "setTimeout(loop_se70m1);" form 904 of FIG. 9a. 905 of FIG. 9a is empty in this case.

Referring to lines 29 to 41 of loop_client_js.txt, a client to server connection is generated at the end of client operations group 1 which is line 22 of loop_client_js.txt, as a process of processing sequential operations. Line 29 calls callServer function of the client side dispatcher CSA. Line 30 specifies that the "server implement information" for executing the server code is ['ServerTasks.ServerTaskX']; if the server side dispatcher is csaServer_js.txt running under Node.js then csaServer_js.txt uses this information to load server library ServerTasks.ServerTaskX.js; if the server side dispatcher is csa.aspx/csa.dll then csa.dll uses this information to load an assembly ServerTasks.DLL which exports a type ServerTaskX. Lines 31 to 34 specify that the server code to be executed is ['serverA.js', 'loop_server1.js']; serverA.js is a sample "server-technology-independent API" which is used by loop_html.txt; as stated in the process of processing sequential operations, loop_server1.js is generated for server operations group; the server operations group is 903 in FIG. 9a; loop_server1.js is 804 in FIG. 8 and 907 in FIG. 9b. Lines 35 to 39 specify upload values {var1: var1, idx2: idx2, idx3: idx3}; these values are used in the server operations shown at lines 20 and 21 of loop_html.txt.

Referring to lines 8 and 9 of loop_server1_js.txt, server variables var2 and var3 are added to download value list through a server side dispatcher. Referring to line 25 of loop_html.txt, it shows that server values var2 and var3 are used in a client operation, thus, these server values become download values.

Referring to lines 5, 6, and 7 of loop_server1_js.txt, these lines are generated from lines 19, 20, and 21 of loop_html.txt by a client-server-automation preprocessor. Line 20 and 21 of loop_html.txt use client values var1, idx2 and idx3. A client-server-automation-preprocessor needs to use uploaded values to imitate a code execution scope in the programming so that the uploaded values are accessible by server code to be executed, as stated in claim 1. In lines 6 and 7 of loop_server1_js.txt, client values used in server operations are substituted with upload values; var1 is substituted with clientvalues.var1, idx2 is substituted with clientvalues.idx2, and idx3 is substituted with clientvalues.idx3. Another way to imitate a code execution scope is for a server side dispatcher to make upload values into global variables; for example, declare global variable var1, idx2, and idx3, and initialize them to clientvalues.var1, clientvalues.idx2 and clientvalues.idx3. If server side dispatchers work in such a way then a client-server-automation-preprocessor should not substitute client values in server operations. The way server side dispatcher work and the way a client-server-automation-preprocessor work to imitate server code execution scope should be consistent.

Referring to lines 23 to 28 of loop_client_js.txt, a callback function is generated to execute client operations group 2, as stated in the process of processing sequential operations and shown by 805 in FIG. 8, and shown by 908 in FIG. 9b. Lines 24 to 27 inside the callback function are client operations group 2 as shown by 904 in FIG. 9a and 909 in FIG. 9b.

Lines 24 to 25 of loop_client_js.txt are generated from lines 23 to 27 of loop_html.txt by a client-server-automation-preprocessor; lines 23 to 27 of loop_html.txt form 1117 in FIG. 11b. As stated in claim 4, line 26 of loop_client_js.txt calls an increment function, as shown by 1118 of FIG. 11b. As stated in claim 4, line 27 of loop_client_js.txt uses a recursive call to a loop function, as shown by 1121 of FIG. 11b.

Line 25 of loop_client_js.txt is generated from line 25 of loop_html.txt by replacing server values var2 and var3 with download values CSA.values.var2 and CSA.values.var3. This is one way of imitating client side code execution scope with server values. Another way to imitate client side code execution scope is for a client side dispatcher to assign download values to client side variables, and a client-server-automation-preprocessor does not replace server values in client operations. The way client side dispatcher work and the way a client-server-automation-preprocessor work to imitate client code execution scope should be consistent. A client side dispatcher csajs.txt actually supports both ways because lines 158 to 166 of csa_js.txt assign download values to client side variables.

Example 17

Generated Html file—loop_p_html.txt. This is a web page named as loop_p.html. This is a web page generated from processing web page loop.html, submitted as loop_html.txt. Naming the web page file as loop_p.html instead of using the original file name loop.html is only for clarity on explaining processes defined in claims. In an actual production distribution, the generated file may use the original file name and take precautions to prevent from overwriting the original files with generated files.

Line 6 includes a client side dispatcher to the web page because the web page loop_html.txt contains server side operations. A client side dispatcher is needed for running client-server-automation.

Line 7 includes a client side JavaScript file, loop_client.js, to the web page. The client side JavaScript file is generated by a client-server-automation preprocessor. The file loop_client.js is submitted as a file named loop_client_js.txt for this application.

Example 18

Html design and programming file—enumClient_html.txt. This is a web page showing a sample of using server operations, as shown by 1202 in FIG. 12*a*, in a client value enumeration, as shown by 1201 in FIG. 12*a*.

Line 5 includes a JavaScript file, serverA.js, to be used by programming of this page. By line 4 of serverA_js.txt, a client-server-automation preprocessor knows that it provides a server side object.

Line 30 is a button for executing a JavaScript function "start" which is defined in lines 7 to 25.

Lines 9, 10 and 11 prepare a client object "obj"; two properties are added to "obj"; one property is named "A", the other property is named "B".

Line 14 starts enumerating properties of client value "obj".

Lines 15, 16 and 17 are client operations.

Lines 18, 19 and 20 are server operations involving client values.

Lines 21 and 22 are client operations involving server values.

Lines 15 to 22 are programming for handling each enumerated value. These lines show disappearing of a boundary between client side programming and server side programming; the programming mixes client operations, server operations, client values and server values.

Example 19

Processing of JavaScript code in web page enumClient_html.txt by a client-server-automation preprocessor generates following files as FIG. 5 shows: web page file enumClient_p_html.txt which is described in Example 20, client side JavaScript file enumClient_client_js.txt, and server side JavaScript file enumClient_server1_js.txt.

As shown in FIG. 12*a* and FIG. 12*b*, and described in claim 5, a client value enumeration involving server operations is simulated with a recursive function by a client-server-automation preprocessor.

Lines 7 to 12 of enumClient_client_js.txt are from lines 8 to 13 of enumClient_html.txt; these lines only involve client operations and client values, there is not a need of special handling by a client-server-automation.

Referring to line 13 of enumClient_client_js.txt, it declares and initializes a "used key array", as stated in claim 5 and shown by 1204 in FIG. 12*b*.

Lines 56 to 58 defines a function after_ti13jy, as shown by 1209 of FIG. 12*b* and stated in claim 5. Line 24 of enumClient_html.txt is programming after a client enumeration, as shown by 1203 in FIG. 12*a*. Line 57 of enumClient_client_js.txt is generated from 1203 in FIG. 12*a* and becomes 1210 in FIG. 12*b*.

Lines 14 to 59 of enumClient_client_js.txt define a loop function for simulating the client value enumeration, as shown by 1205 in FIG. 12*b* and stated in claim 5.

Lines 53 to 55 of enumClient_client_js.txt finish enumeration, as shown by 1208 in FIG. 12*b* and stated in claim 5.

Lines 15 to 52 of enumClient_client_js.txt use a code structure shown by 1206 of FIG. 12*b* to contain a part of code 1207 of FIG. 12*b*, as stated in claim 5. Lines 27 to 49 of enumClient_client_js.txt form 1207 of FIG. 12*b*. Lines 29 to 49 of enumClient_client_js.txt are generated by processing lines 15 to 22 of enumClient_html.txt. A process defined for the processing of sequential operations is used to process lines 15 to 22 of enumClient_html.txt to generate lines 29 to 49 of enumClient_client_js.txt, as shown by FIG. 9*a* and FIG. 9*b*, because these lines form sequential client and server operations.

Lines 15 to 22 of enumClient_html.txt form 1211 in FIG. 12*b*; a setTimeout call forms 1212 in FIG. 12*b*. A process of preprocessing sequential operations, as shown by FIG. 9*a* and FIG. 9*b*, is used to process the programming of lines 15 to 22 of enumClient_html.txt followed a setTimeout call to a loop function.

Lines 15, 16 and 17 of enumClient_html.txt form 901 in FIG. 9*a*; lines 18, 19 and 20 of enumClient_html.txt form 903 in FIG. 9*a*; lines 21 and 22 of enumClient_html.txt form 904 in FIG. 9*a*; according to claim 5, a recursive call to "loop function" should follow lines 21 and 22 of enumClient_html.txt, that is 1212 in FIG. 12*b*. So, a setTimeout call forms 905 in FIG. 9*a*.

Referring to lines 29 to 31 of enumClient_client_js.txt, these lines are client operations (group 1) shown by 906 in FIG. 9*b*, these lines are generated from lines 15 to 17 of enumClient_html.txt as shown by 901 in FIG. 9*a*, as stated in the process of processing sequential operations. By the process of processing sequential operations, at the end of client operations (group 1) a server connection is generated, as shown by lines 37 to 49 of enumClient_client_js.txt. By the process of processing sequential operations, client operations group 2 and the rest of programming are collected in a callback function; client operations group 2 is formed by lines 21 and 22 of enumClient_html.txt followed by a setTimeout call, and represented by 904 in FIG. 9*a*; client operation group 2 is processed to generate lines 33, 34 and 35, and represented by 907 in FIG. 9*b*; the callback function is defined by lines 32 to 36 of enumClient_client_js.txt, as shown by 908 in FIG. 9*b*.

Referring to lines 37 to 49 of enumClient_client_js.txt, a client to server connection is created for linking 906 to 907 in FIG. 9*b*. Line 37 makes a call to function callServer on a client side dispatcher CSA to connect to server; line 38 specifies that "server implement information" is ['ServerTasks.ServerTaskX'], this information is from line 5 of serverA_js.txt, serverA.js is included in enumClient_htmll.txt at line 5; lines 39 to 42 specify server code files for the server connection to be ['serverA.js', 'enumClient_server1_js'], serverA.js is a sample "server-technology-independent API" which is used by enumClient_html.txt, enumClient_server1.js is generated for server operations group as shown by 903 in FIG. 9*a* and 907 in FIG. 9*b*; lines 43 to 47 specify upload values to be {v:v, n:n, v2:v2}, these values are used in the server operations shown at lines 18 to 20 of enumClient_html.txt as shown by 903 of FIG. 9*a*. By the process of processing sequential operations, server operations of lines 18 to 20 of enumClient_html.txt, as shown by 903 in FIG. 9*a*, should be executed on this server connection; lines 5 to 7 of enumClient_server1_js.txt are generated for the server operations, as shown by 907 in FIG. 9*b*.

Referring to lines 8 and 9 of enumClient_server1js.txt, server variables var2 and var3 are added to download value list through a server side dispatcher. Referring to line 21 of enumClient_html.txt, it shows that server values var2 and var3 are used in a client operation, thus, these server values become download values.

Referring to lines 5, 6, and 7 of enumClient_server1_js.txt, these lines are generated from lines 18, 19 and 20 of enumClient_html.txt by a client-server-automation preprocessor. Line 19 and 20 of enumClient_html.txt use client values v, n and v2. A client-server-automation-preprocessor needs to use uploaded values to imitate a code execution scope in the programming so that the uploaded values are accessible by server code to be executed, as stated in claim 1. In lines 6 and 7 of enumClient_server1_js.txt, client values used in server operations are substituted with upload values; v is substituted with clientvalues.v, n is substituted with clientvalues.n, and v2 is substituted with clientvalues.v2. Another way to imitate a code execution scope is for a server side dispatcher to make upload values into global variables; for example, declare global variable v, n, and v2, and initialize them to clientvalues.v, clientvalues.n and clientvalues.v2. If server side dispatchers work in such a way then a client-server-automation-preprocessor should not substitute client values in server operations. The way server side dispatcher work and the way a client-server-automation-preprocessor work to imitate server code execution scope should be consistent.

Example 20

Generated Html file—enumClient_p_html.txt. This is a web page named as enumClient_p.html. This is a web page generated from processing web page enumClient.html, submitted as enumClient_html.txt. Naming the web page file as enumClient_p.html instead of using the original file name enumClient.html is only for clarity on explaining processes defined in claims. In an actual production distribution, the generated file may use the original file name and take precautions to prevent from overwriting the original files with generated files.

Line 6 includes a client side dispatcher to the web page because the web page enumClient_html.txt contains server side operations. A client side dispatcher is needed for running client-server-automation.

Line 7 includes a client side JavaScript file, enumClient_client.js, to the web page. The client side JavaScript file is generated by a client-server-automation preprocessor. The file enumClient_client.js is submitted as a file named enumClient_client_js.txt for this application.

Example 21

Source code—file name: serverB_js.txt. This file shows an example of a part of "server-technology-independent API" for providing some sample server side functions. This file defines an object named simulatedObject; it defines a function, fun1, which returns information related to current date time, thus, if this function is executed at a server then it shows server date time. This file is used in a sample web page, enumServer_html.txt, for doing server value enumeration.

Line 15 sets a flag to indicate that simulatedObject is a server side object.

Line 16 specifies "server implement information" for the library. In this sample, it is an empty array indicating that this library only needs functionalities provided by JavaScript running at a server.

Example 22

Html design and programming file—enumServer_html.txt. This is a web page showing a sample of using client operations, as shown by 1302 in FIG. 13*a*, in a server value enumeration, as shown by 1301 in FIG. 13*a*.

Line 5 includes a JavaScript file, serverB.js, to be used by programming of this page. By line 15 of serverB_js.txt, a client-server-automation preprocessor knows that it provides a server side object.

Line 21 is a button for executing a JavaScript function "start" which is defined in lines 7 to 16.

Lines 8 and 9 are two client operations. Line 10 enumerates properties of simulatedObject which is a server object. Line 11 executes a function on simulatedObject, passing a client value into this server function. Line 12 is a client operation using some server values. Line 13 is another client operation. From programming of lines 8 to 13, client operations, server operations, client values and server values are all mixed, showing disappearing of a boundary between client side programming and server side programming.

Example 23

Processing of JavaScript code in web page enumServer_html.txt by a client-server-automation preprocessor generates following files as FIG. 5 shows: web page file enumServer_p_html.txt which is described in Example 24, client side JavaScript file enumServer_client_js.txt, and server side JavaScript file enumServer_server1_js.txt.

As shown in FIG. 13*a*, FIG. 13*b*, FIG. 13*c* and FIG. 13*d*, and defined in claim 6, a server value enumeration involving client operations is simulated with a recursive function by a client-server-automation preprocessor.

Line 15 of enumServer_html.txt forms 1303 of FIG. 13*a*. As stated in claim 6, referring to lines 33 to 35 of enumServer_client_js.txt, an "afterLoop function" is generated by a client-server-automation preprocessor, shown by 1312 in FIG. 13*b*; line 34 of enumServer_client_js.txt is 1313 in FIG. 13*b*.

Line 9 of enumServer_client_js.txt is the "used key array" defined in claim 6 and shown by 1304 in FIG. 13*b*.

Lines 10 to 32 of enumServer_client_js.txt form "loop function" defined in claim 6 and shown by 1305 in FIG. 13*b*.

By claim 6, the contents of the "loop function", which is 1305 of FIG. 13*b*, are generated from programming 1306 of FIG. 13*b*. By claim 6, programming 1306 of FIG. 13*b* is formed by following programming: remove used key from download value list if it exists, as shown by 1307 of FIG. 13*b*, switch execution context from client to server, as shown by 1308 of FIG. 13*b*, and the "handling code" as shown by 1309 of FIG. 13*b* and shown by lines 11 to 13 of enumServer_html.txt, followed by pushing used enumeration key in download value list to the "used key array", as shown by 1310 of FIG. 13*b*, and a recursive call to "loop function", as shown by 1311 of FIG. 13*b*. Programming 1306 of FIG. 13*b* for this sample as described above forms sequential of operations, thus, processing of programming 1306 of FIG. 13*b* follows a process of processing sequential operations.

As defined by the process of processing sequential operations, 1307 of FIG. 13*b* is client operation (group 1) 901 of FIG. 9*a*; 1308 of FIG. 13*b* is 902*a* of FIG. 9*a*; line 11 of enumServer_html.txt forms server operations (group 1) 903 of FIG. 9*a*; lines 12 and 13 of enumServer_html.txt form client operations (group 2) 904 of FIG. 9*a*, a server-to-client execution context switching point is identified before line 12 of enumServer_html.txt as shown by 902*b* of FIG. 9*a*; 1310 and 1311 of FIG. 13*b* form 905 of FIG. 9*a*.

By a process of processing sequential operations, line 11 of enumServer_client_js.txt, as shown by 906 of FIG. 9*b*, is generated for 1307 of FIG. 13*b* as client operation (group 1) 901 of FIG. 9*a*; lines 22 to 31 of enumServer_client_js.txt are generated for connecting 906 to 907 and from 907 to 908 in FIG. 9*b*, note that this connection is at one end of execution path as stated in claim 2 for removing one pair of context switching points; line 23 of enumServer_client_js.txt specifies "server implementation information" which is from line 16 of serverB_js.txt, which is an empty array; lines 24 to 27 of enumServer_client_js.txt specify server code files to be executed on this connection, which include serverB.js which is required by server object simulatedObject, and enumServer_server1_js.txt which is generated for the server code; line 28 of enumServer_client_js.txt specifies upload values, in this case it is a client variable k used in a server operation of line 11 of enumServer_html.txt; line 30 of enumServer_client_js.txt specifies "used key array" as stated in claim 6; lines 12 to 21 of enumServer_client_js.txt generate a callback function as shown by 908 of FIG. 9*b*; by the process of processing sequential operations, lines 14 to 17 of enumServer_client_js.txt are generated for 904 and 905 of FIG. 9*a* as 909 and 910 of FIG. 9*b*; by claim 6 and shown by FIG. 13*d*, the callback function 908 of FIG. 9*b* is adjusted to be 1320 of FIG. 13*d*; lines 14 to 17 of enumServer_client_js.txt generated by the process of processing sequential operations are used as 1322 of FIG. 13*d*; 1321 of FIG. 13*d* is generated as line 13 of enumServer_client_js.txt; 1323 of FIG. 13*d* is generated by lines 18 to 20 of enumServer_client_js.txt.

By a process of processing sequential operations, lines 19 to 22 of enumServer_server1_js.txt, as shown by 907 of FIG. 9*b*, are generated from line 11 of enumServer_html.txt as shown by 903 of FIG. 9*a* and download values for those server values used in a client operation at line 12 of enumServer_html.txt; by a process of claim 6, lines 19 to 22 of enumServer_server1_js.txt generated for the process of processing sequential operations should be placed as 1318 in a code structure shown by FIG. 13*c*. Lines 5 and 25 of enumServer_server1_js.txt are generated as shown by 1314 of FIG. 13*c*; lines 6 to 15 of enumServer_server1_js.txt are generated as shown by 1315 of FIG. 13*c*; lines 16 to 18 of enumServer_server1_js.txt are generated as shown by 1316 of FIG. 13*c*; line 23 of enumServer_server1_js.txt is generated as shown by 1317 of FIG. 3*c*; line 24 of enumerServer_server1_js.txt is generated as shown by 1319 of FIG. 13*c*.

Example 24

Generated Html file—enumServer_p_html.txt. This is a web page named as enumServer_p.html. This is a web page generated from processing web page enumServer.html, submitted as enumServer_html.txt. Naming the web page file as enumServer_p.html instead of using the original file name enumServer.html is only for clarity on explaining processes defined in claims. In an actual production distribution, the generated file may use the original file name and take precautions to prevent from overwriting the original files with generated files.

Line 6 includes a client side dispatcher to the web page because the web page enumServer_html.txt contains server side operations. A client side dispatcher is needed for running client-server-automation.

Line 7 includes a client side JavaScript file, enumServer_client.js, to the web page. The client side JavaScript file is generated by a client-server-automation preprocessor. The file enumServer_client.js is submitted as a file named enumServer_client_js.txt for this application.

Example 25

Html design and programming file—callAsync_html.txt. This is a web page showing a sample of processing and calling a client to server asynchronous function, as shown by FIG. 14*a*, FIG. 14*b* and FIG. 14*c*.

Line 5 includes a JavaScript file, serverA.js, to be used by programming of this page. By line 4 of serverA_js.txt, a client-server-automation preprocessor knows that it provides a server side object.

Line 31 is a button for executing a JavaScript function "start" which is defined in lines 17 to 26.

Lines 7 to 16 define a sample function "asyncfunc" which involves client operations and server operations and thus showing disappearing of a boundary of client side programming and server side programming.

Lines 17 to 26 define a function "start" which is used as an event handler of a button's onclick event. Line 21 makes a call to a function and gets a function return value. Line 22 shows the function return value on the web page. In this sample, a client to server asynchronous function is called. A programming by lines 21 and 22 looks as if it is calling a synchronous function, making the programming simple and intuitive.

Example 26

Processing of JavaScript code in web page callAsync_html.txt by a client-server-automation preprocessor generates following files as FIG. 5 shows: web page file callAsync_p_html.txt which is described in Example 27, client side JavaScript file callAsync_client_js.txt, and server side JavaScript file callAsync_server1_js.txt.

As shown in FIG. 14*a*, FIG. 14*b*, and FIG. 14*c*, and stated in claim 7 and claim 8, a client to server asynchronous function is processed so that an asynchronous function is used as if it is a synchronous function.

Referring to lines 6 to 33 of callAsync_client_js.txt excluding lines 12 to 18, the contents of function "asyncfunc" are generated from lines 7 to 16 of callAsync_html.txt by a client-server-automation preprocessor using processes of claim 1, claim 2 and the process of processing sequential operations, and demonstrated by example 5, example 9, example 10 and example 11; server code callAsync_server1_js.txt is also generated by the processes. Referring to FIG. 14*a*, function "asyncfunc" defined by lines 6 to 33 of callAsync_client_js is 1402; lines 7 to 9 and 20 to 32 form 1403 in FIG. 14*a*; callback function of lines 10 to 19 forms 1404 in FIG. 14*a*; line 11 forms 1405 in FIG.

14a. By claim 7, a "run type attribute" should be used to indicate that function "asyncfunc" is a client to server asynchronous function, as shown by 1401 in FIG. 14a; line 5 of callAsync_client_js.txt is thus generated by a client-server-automation preprocessor. By claim 7, code is appended to the end of the last server connection callback function; lines 12 to 18 of callAsync_client_js.txt form 1406 in FIG. 14a showing this process. By claim 7, return value of "asyncfunc" should be assigned to "return value attribute", as shown by 1407 of FIG. 14a; line 13 of callAsync_client_js.txt is thus generated. By claim 7, if "next function attribute" exists then "next function attribute" is executed, as shown by 1408; lines 14 to 16 are thus generated by a client-server-automation preprocessor.

Line 21 of callAsync_html.txt shows a function call; by line 25 the function call is made to a client to server asynchronous function. Referring to FIG. 14b, line 20 of callAsync_html.txt forms 1409 in FIG. 14b; line 21 of callAsync_html.txt forms 1410 in FIG. 14b; lines 22 and 23 of callAsync_html.txt form 1411 in FIG. 14b. By claim 8, an "after function" is generated from 1411 in FIG. 14b as shown by 1418 in FIG. 14c; lines 39 to 42 of callAsync_client_js.txt are thus generated. By claim 8, "next function attribute" should be generated as shown by 1413 in FIG. 14c; lines 44 to 47 of callAsync_client_js.txt are thus generated. By claim 8, value of "return value attribute" of the "asynch function" should be assigned to the "ret variable", as shown by 1414 in FIG. 14c; line 45 of callAsync_client_js.txt is thus generated. By claim 8, there should be a call to "after function", as shown by 1415 in FIG. 14c; line 46 of callAsync_client_js.txt is thus generated. By claim 8, after generating the "next function attribute", there should be a function call to the "asynch function", as shown by 1416 in FIG. 14c; line 48 of callAsync_client_js.txt is thus generated.

Example 27

Source code—file name: FormCsaPreproc_cs.txt. This file, together with other files, FormCsaPreproc.Designer_cs.txt, FormCsaPreproc_resx.txt, FormInfo_cs.txt, Form Info.Designer_cs.txt, FormInfo_resx.txt, Program_cs.txt, and WebPageInterAction_cs.txt, are used to compile into an EXE file as a standalone utility of Client-Server-Automation-Preprocessor. This utility has been tested under Microsoft Windows® 8.0 with Internet Information Server® enabled. This utility takes two command line arguments. The first argument is for a full file path of a HTML file to be processed by the utility. The second argument is for a folder for the utility to generate files. This utility processes JavaScript code in the HTML file, analysis client server related programming logic and generates a client side JavaScript file, one or more server side JavaScript files, and a HTML file modified from the HTML file being processed by adding the client side JavaScript file and removing processed JavaScript code.

All files involved in previous examples were generated by this utility if they are generated by a client-server-automation preprocessor.

Lines 180 to 193 validate command line arguments.

Lines 201 to 203 use HtmlAgilityPack to load the HTML file to be processed and find all JavaScript code contained in the HTML file. HtmlAgilityPack is an open source project available at http://htmlagilitypack.codeplex.com/.

Line 211 loads a web page csapreproc.html into a web control. This web page contains a Client-Server-Automation-Preprocessor in JavaScript. This utility uses the web browser control to interact with the Client-Server-Automation-Preprocessor in JavaScript.

Lines 48 to 97 go through scripts in the HTML file to find JavaScript code to be processed. Line 57 checks to see if a script file is used. If a script file is not used then the script code is taken as part of programming code to be processed, as lines 92 to 95 shown. If a script file is used then it checks to see if the first line of the file is "//Client Server Automation"; if it is then the file is treated as programming code and file contents are appended to the code to be processed, as line 67 shown; if it is not then the file is treated as a library file. Library files will be loaded for programming analysis, as lines 71 to 81 shown.

Line 100 loads programming code to be processed.

Line 104 starts processing the programming code.

Line 107 finds out how many server connections are generated.

Lines 110 to 115 write a client side JavaScript file to the output folder.

Lines 117 to 125 write a server side JavaScript file for every server connection generated.

Lines 127 to 131 removes processed JavaScript files, including library files.

Lines 141 to 143 adds a client side dispatcher to the HTML file.

Lines 144 to 146 adds the client side JavaScript file to the HTML file.

Lines 147 to 148 write modified HTML file to the output folder.

Example 28

Source code—file name: csapreproc_html.txt. The file is loaded into a web browser control in a standalone utility of Client-Server-Automation-Preprocessor, as shown in Example 27. The web page file includes 3 CSS files and 3 JavaScript files from Esprima; these files are built-editor.css, style.css, foundation.min.css, esprima.js, escodegen.browser.js, and built-editor.min.js. Esprima is an open source project available at https://github.com/ariya/esprima.

Line 54 includes a JavaScript file, csapreproc.js. This JavaScript carries out Client-Server-Automation preprocessing.

Example 29

Source code—file name: csapreproc_js.txt. The JavaScript file carries out Client-Server-Automation preprocessing. It uses Esprima to parse programming code to be processed. It uses Esprima to generate client server related JavaScript code. Esprima is an open source project available at https://github.com/ariya/esprima.

Lines 2347 to 2376 define a programming interface for testing, debugging and for interactions with a standalone utility.

Line 2388 notifies a standalone utility that a preprocessor is ready to be used.

Lines 75 to 2346 define a Client-Server-Automation-Preprocessor object named CSAPREPROC.

Lines 2173 to 2345 establish a programming interface of CSAPREPROC. The programming interface is supposed to be used by a standalone utility, or by a JavaScript engine, or by a web server, for doing client-server-automation preprocessing on demand.

Lines 2174 to 2304 load JavaScript code. If the code to be loaded is for a library file then it searches for RunAt flag and ServerTypes attribute of objects defined in the library. Such information will be used for generating code performing AJAX calls and client server related operations.

Lines 2115 to 2172 perform Client-Server-Automation-Preprocessing on loaded programming code.

Lines 299 to 347 define a function for detecting code branching situations, as defined in claim 3.

Lines 994 to 1093 define a function for handling code branching situation 2, as defined in claim 3.

Lines 1564 to 1647 handle code branching situations as defined in claim 3.

Functions findDownloadValueName (lines 430 to 442), addDownAndStateValues (lines 443 to 510), collectUploads (lines 563 to 647), findDownloadAndStateValues (lines 886 to 907), and createDownloadCode (382 to 384) are for identifying download values, upload values and state values, and generate code for handling them, as defined in claim 1.

Functions finishContextSwitchingPair (lines 731 to 885) and generateServerCall (lines 1094 to 1126) are used to remove a pair of client to server and server to client execution context switching points, as defined in claim 2.

Function generateForLoop (1463 to 1522) handles code looping as defined in claim 4.

Function generateForInLoopClient (1392 to 1462) handles client side enumeration as defined in claim 5.

Function generateForInLoopServer (1172 to 1391) handles server side enumeration as defined in claim 6

Functions adjustAsyncFunction (2013 to 2063), adjustAsynReturn (lines 1987 to 2012) and createAsynReturn (1945 to 1986) handle a client to server asynchronous function as defined in claim 7.

Function isClientAsyncCall (lines 1523 to 1560) and lines 1678 to 1779 handles a call to a client to server asynchronous function as defined in claim 8.

Lines 1651 to 1677 checks to see if a server operation follows client operations to detect if there is a client to server execution context switching point exists in a sequential of operations; lines 1788 to 1811 generate a client to server Ajax connection if a client to server execution context switching point exists; line 1808 processes server operations and rest of programming; line 1810 breaks current processing and thus the server connection code is generated at one end of execution path. Above processing is for processing sequential operations.

Lines 1856 and 1857 detect a server operation follows client operations and thus there is a client to server execution context switching point exists in a sequential of operations; lines 1859 to 1870 generate a client to server Ajax connection; line 1868 processes server operations and rest of programming; line 1870 breaks current processing and thus the server connection code is generated at one end of execution path. Above processing is for processing sequential operations.

In function processFunctionBody (lines 1561 to 1937), each programming statement is checked to see if it is a client operation or a server operation. If it is a server operation and the current execution context is CLIENT_CONTEXT then a client to server execution context switching point is identified. If it is a client operation and the current execution context is SERVER_CONTEXT then a server to client execution context switching point is identified.

INDUSTRIAL APPLICABILITY

For all the world wide web programming for building web sites and web applications, if server functionality is involved then the programming can benefit from the present invention. Developers for intranet applications may also benefit from the present invention because most intranet applications involve heavy server side functionality.

Smart phone application development can benefit from the present invention because most smart phone applications involve server side functionality. For example, Client-Server-Automation can be added to compilers of Object C and Swift, both from Apple Inc.

Embodiments of present invention show these and other advantages. Those skilled in the art may make variations and modifications to the above embodiments based on concepts of present invention. Those skilled in the art may implement the concepts of present invention on platforms and in computer languages other than platforms and computer languages used by embodiments of present invention. This invention is not limited to particular embodiments, but includes all implementations making use of concepts disclosed in specification, embodiments, drawings and claims of present invention. What is claimed is:

The invention claimed is:

1. A method for creating a process of human computer programming without mandatorily distinguishing client side programming and server side programming, said process includes an execution environment and a preprocessor; said preprocessor generates client side code and server side code from human programming which is coded without distinguishing between client side coding and server side coding; while generating client code and server code the preprocessor creates execution scopes at the server and at a client by imitating execution scopes coded by the human programming as a single execution scope, the execution scope is imitated by the preprocessor by values visible by the client code and the server code within the scope, including server states included into upload and download values by the preprocessor, where the server states are the server values from previous server connections and needed by code to be executed at the server for subsequent server connections; the preprocessor identifies and generates a client server connection with the following criteria: if human programming statement is a server operation and current execution context is the client, then a client to server execution context switching point is identified to be before the human programming statement, if the human programming statement is the client operation involving server side values and the human programming statement has not already been arranged into a callback function by the preprocessor for the client server connection then the client to server execution context switching point is identified to be before the human programming statement, if the human programming statement is the client operation and the current execution context is the server then the server to client execution context switching point is identified to be before the human programming statement; said execution environment supports multiple server technologies and, from a point of view of a human programmer, human programming can be done without mandatorily distinguishing server technologies to be actually used; said process uses a server-technology-independent Application Programming Interface (API) for server side code programming and code generation by the preprocessor, the server-technology-independent API is implemented by supported server technologies, a server side dispatcher executes the server code using corresponding implementation of the server-technology-independent API with corresponding server technology, at a time of making the client server connection, among upload values and the server code for the client server connection, there is information identifying server side libraries implementing server-technology-independent API, said information is referred to as server implement information, for server technology using Active Server Page Extended (ASPX) the server implement information can include type information and Dynamic Library Link (DLL) path so that a software framework can dynamically load assemblies needed by the parts of implementation of the server-technology-independent API referenced by the server code, for server technology using PHP the server implement information can include PHP file names for the parts of implementation of the server-technology-independent API referenced by the server code, for server technology using server side JavaScript the server implement information includes JavaScript file names for the parts of implementation of the server-technology-independent API referenced by the server code.

2. The method of claim 1, further comprising of a process used by said preprocessor to process a human programming by removing pairs of client to server and server to client execution context switching points, one pair at a time; said process handles a human programming which involves n pairs of client to server and server to client execution context switching points, n>0, by removing one pair of client to server and server to client execution context switching points via placing one client to server connection at one end of an execution path, executing server code on the client to server connection, forming the callback function for the client to server connection using rest of human programming after the pair of execution context switching points, thus the human programming after above process involves n-1 pairs of client to server and server to client execution context switching points; said preprocessor repeats above process n times to remove all pairs of client to server and server to client execution context switching points from the human programming; at one code branch the last pair of execution context switching points can include only client-to-server execution context switching point without server-to-client execution context switching point, in that case the callback function is not needed.

3. The method of claim 1, further comprising of a process used by said preprocessor to process code branching in a human programming; said process handles 6 situations; situation 1 occurs when the first human programming statement in each branch is the client operation and the current execution context is the server, the code branching is treated as the client operation and a server to client execution context switching point is identified to be before the code branching, the code branching is placed in a client callback function, each code branch is further processed by said preprocessor separately; situation 2 occurs when at least there is one branch having its first human programming statement being the server operation and at least there is one client operation in one of code branches and the current execution context is the server, a server to client execution context switching point is identified, the code branching is duplicated at both the server side and a client side callback function, the server values used in the branching condition are preserved as the download values separated from corresponding server variables, server operations at beginning of each branch are included in a server side code branching to be generated, a client side code branching is formed by the client operations at beginning of each branch and the client operations following the server operations at the beginning of each branch, if a situation 2 code branching is nested at beginning of a code branch or following the server operations at beginning of a code branch then the nested situation 2 code branching is also handled by duplicating code branching as defined above, if a code branching other than situation 2 is nested at beginning of a code branch or following the server operations at beginning of a code branch then the nested code branching is placed at a client side callback function; situation 3 occurs when the current execution context is the client and branching condition involves client values only, the client or server side code branching is treated as the client operation and there is not an execution context change, each branch is further processed by said preprocessor separately; situation 4 occurs when the current execution context is the client and branching condition involves the server values, if the current execution context is within a callback function for a server connection then it is treated as situation 3 and the server values involved in the branching condition are download values treated as the client values, if the current execution context is not within acallback function for a server connection then the client to server execution context switching point is identified, client values used in the branching condition are the upload values, server code is generated to get server values used in the branching condition, the current execution context switches to be the server execution context, processing of the code branching is switched to situations when current execution context is the server, which includes situation 1 and situation 2; situation 5 occurs when all code branches are empty, this situation is not treated as client or server side code branching but treated as an expression statement where the code branching condition is used as the expression; situation 6 occurs when current execution context is the server and all branches do not involve client operations, this situation is treated as one single server operation.

4. The method of claim 1, further comprising of a process used by said preprocessor to process human programming involving code looping formed by initialization operations, loop conditions at beginning or at ending of looping, repeated operations followed by increment operations, and operations after loop; each of above listed operations can be empty; among the loop conditions, repeated operations and the increment operations there is at least one client operation and one server operation; said preprocessor processes the human programming to implement the following coding logic: code execution starts with the initialization operations, and then repeated operations and increment operations are repeatedly executed, for each time of executing repeated operations and increment operations, loop condition at beginning of looping is evaluated before the execution and a loop condition at ending of looping is evaluated after the execution, if the loop condition evaluates to False then the operations after loop are executed and the repeated operations and the increment operations are no longer executed, and the execution path breaks from the loop; said process uses a recursive function to simulate code looping; said process generates a function which is referred to as a loopScope function, variables declared inside the initialization operations are declared in the loopScope function, inside the loopScope function a recursive function is defined which is referred to as a loop function; a programming is formed by above variable declarations followed by the initialization operations and a code for executing the loop function, said formed programming is processed by said preprocessor and the code thus generated is placed inside the loopScope function; said process generates another function referred to as an afterLoop function defined in the scope of the loop function, said preprocessor processes operations after the loop and places generated client side code inside the afterLoop function; said process generates a function which is referred to as an increment function if the increment operations present, said preprocessor processes the increment operations and places generated code inside the increment function; said preprocessor processes following programming and places generated client side code inside the loop function: if the loop condition at beginning of looping presents and evaluates False then execute the afterLoop function else execute repeated operations followed by a call to the increment function, if loop condition at ending of looping presents and evaluates to False then execute the afterLoop function else use a recursion to call the loop function; said process handles programming of a continue statement by generating a call to the increment function and a call to the loop function as one end of the execution path in the loop function; said process handles programming of a break statement by generating a call to the afterLoop function as one end of the execution path in the loop function; in a case of nested code looping, if an inner loop needs to be processed as defined above then all its outer loops are also processed using the process defined above with following exception: evaluation of the loop conditions at ending of an outer loop, executing the increment operations of the outer loop and a recursive call of the loop function for the outer loop are placed at the end of the afterLoop function for every inner loop immediately contained by the outer loop, where immediately contained means that the inner loop is not contained by another inner loop of the outer loop.

5. The method of claim 1, further comprising of a process used by said preprocessor to process human programming involving an enumeration of client values where the human programming for handling each enumerated value includes server operations; said process creates a function which is referred to as an afterLoop function, said preprocessor processes the human programming following the enumeration and places generated client side code inside the afterLoop function; said process generates code to declare an array and initialize it with an empty array, the array is for remembering used enumeration keys, it is referred to as used key array; said process generates a function following the code declaring and initializing the used key array, the function is referred to as a loop function; said process generates following code inside the loop function: the enumeration and the used key array are used to get an unused key and corresponding value, if such an unused key is not found then the afterLoop function is executed and the function finishes, if such an unused key is found then the found unused key is pushed into the used key array, the enumeration breaks, before enumeration-break is code generated by said preprocessor processing the human programming for handling each enumerated value followed by a recursive call to the loop function.

6. The method of claim 1, further comprising of a process used by said preprocessor to process human programming involving an enumeration of server values where the human programming for handling each enumerated value includes client operations, the human programming for handling each enumerated value is referred to as handling code; said process creates a function referred to as an afterLoop function, said preprocessor processes the human programming following the enumeration and places generated client side code inside the afterLoop function; said process generates code to declare an array and initialize it with an empty array, the array is for remembering used enumeration keys, it is referred to as used key array; said process generates a function following the code declaring and initializing the array, the function is referred to as a loop function; said preprocessor processes following programming which is referred to as loop coding and place generated client side code inside the loop function: remove the used key from a download value list if it exists, switch the execution context from the client to the server, followed by the handling code, followed by pushing the used enumeration key in download value list to the used key array, and a recursive call to the loop function; the code generated by said preprocessor processing the loop coding is referred to as generated loop coding; said process modifies the generated loop coding by including the used key array in upload value list for the first server connection in the generated loop coding and placing the server code for the first server connection in the generated loop coding inside a server side enumeration, the server side enumeration uses the uploaded used key array to find an unused key and corresponding value, if such an unused key is not found then the server code finishes and there is not an used key downloaded to client, if such an unused key is found then the key is included in the download value list followed by the server code generated by said preprocessor for the first server connection, and the server enumeration breaks to finish the server connection; said process modifies the generated loop coding by adding a condition evaluation code to the first server connection's callback function, the condition tests existence of an used key among the download values, if the used key exists in the download value list then code for the first callback function in the generated loop coding is executed, if the used key does not exist in the download value list then the afterLoop function is executed.

7. The method of claim 1, further comprising of a process used by said preprocessor to process human programming involving a client function where programming of said client function includes server operations; said process uses said preprocessor to process the human programming of said client function according to claim 1 and generates code inside the client function, and provides further processingad defined below; said process sets an attribute of said client function to indicate that the client function involves asynchronous server operations, said attribute is referred to as a run type attribute; said process adds code to the code generated by said preprocessor for the client function, the code is to be appended to the end of thelast server connection callback function, the code to be appended includes assigning return value of said client function to an attribute of the client function, which is referred to as a return value attribute, and checking another attribute, which is referred to as a next function attribute, of the client function to see whether a function is assigned to said next function attribute, if a function is assigned to said next function attribute then the assigned function is executed; in a case of enabling multiple simultaneous calls of said client function, said process assigns the next function attribute to a local variable at the beginning of the client function and execute the local variable at the end of last callback function instead of executing the next function attribute.

8. The method of claim 7, further comprising of a process used by said preprocessor to process human programming involving a call to a function which has a run type attribute to indicate that the function involves asynchronous server operations, which is referred to as an asynch function, if return value of calling the asynch function is assigned to a variable then the variable is referred to as a ret variable; said process generates a function referred to as an after function; said preprocessor processes human programming following the call to the asynch function and places generated client side code inside the after function; said process generates a function which is referred to as a next function, code inside the next function includes assigning value of thereturn value attribute of the asynch function to the ret variable and a call to the after function; said process generates code to assign the next function to the next function attribute of the asynch function, and followed by a call to the asynch function; if calling of an asynch function is within an expression then a new variable is created to replace the calling of the asynch function in the expression, the new variable receives return value of the asynch function before evaluation of the expression.

* * * * *